(12) United States Patent
Subramanian et al.

(10) Patent No.: US 8,244,825 B2
(45) Date of Patent: Aug. 14, 2012

(54) REMOTE DIRECT MEMORY ACCESS (RDMA) COMPLETION

(75) Inventors: Viswanath Subramanian, San Jose, CA (US); Michael R. Krause, Boulder Creek, CA (US); Ramesh VelurEunni, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1675 days.

(21) Appl. No.: 11/556,973

(22) Filed: Nov. 6, 2006

(65) Prior Publication Data

US 2008/0109526 A1    May 8, 2008

(51) Int. Cl.
*G06F 15/167* (2006.01)
(52) U.S. Cl. ......... 709/212; 709/213; 709/214; 709/215
(58) Field of Classification Search .................. 709/212, 709/203, 208, 209, 210, 213, 214, 215, 216, 709/217
See application file for complete search history.

(56) References Cited

U.S. PATENT DOCUMENTS

| | | | |
|---|---|---|---|
| 5,218,695 A * | 6/1993 | Noveck et al. ........................ 1/1 |
| 6,052,760 A | 4/2000 | Bauman et al. |
| 6,978,312 B2 | 12/2005 | Eydelman et al. |
| 7,096,247 B2 | 8/2006 | Jayam et al. |
| 7,281,030 B1 * | 10/2007 | Davis ............................ 709/212 |
| 2004/0255061 A1 * | 12/2004 | Kong et al. ...................... 710/33 |
| 2004/0268061 A1 * | 12/2004 | Khare et al. ................... 711/151 |
| 2005/0132077 A1 * | 6/2005 | Biran et al. .................... 709/230 |
| 2005/0273543 A1 * | 12/2005 | Middleton et al. ............ 710/310 |
| 2006/0045005 A1 * | 3/2006 | Blackmore et al. ........... 370/216 |
| 2006/0045099 A1 * | 3/2006 | Chang et al. .................. 370/400 |
| 2006/0168306 A1 | 7/2006 | Makhervaks et al. |
| 2006/0179185 A1 * | 8/2006 | Daly et al. ....................... 710/39 |
| 2006/0200551 A1 | 9/2006 | Bali et al. |

OTHER PUBLICATIONS

D. Dale, "InfiniBand-Enabled Applications & The Data Center of the Future," InfiniBand Trade Association.
T. Moors, "A critical review of 'End-to-end arguments in system design'".
D.P. Reed et al., "Active Networking and End-to-End Arguments".
"Application programming interface", Wikipedia.org.
"Central processing unit", Wikipedia.org.
"Device driver", Wikipedia.org.
"Duplex (telecommunications)", Wikipedia.org.
J.H. Saltzer et al., "End-To-End Arguments in System Design".
"End-to-end principle", Wikipedia.org.
"Ethernet", Wikipedia.org.
"failover", Webopedia.com.
"Failover", Wikipedia.org.
"High availability", Wikipedia.org.
HP 4x InfiniBand: product brief.
HP Fabric Clustering System Release Notes, May 2004.
"Plugin", Wikipedia.org.
"Protocol stack", Wikipedia.org.
"Remote Direct Memory Access", Wikipedia.org.
"Server (computing)", Wikipedia.org.
"Smart pointer", Wikipedia.org.
W. Montgomery, "So you want 5 9's?".
"Switched fabric", Wikipedia.org.
"Symmetric multiprocessing", Wikipedia.org.
D.P. Reed, "The End of the End-to-End Argument," Apr. 2000.

(Continued)

*Primary Examiner* — Barbara Burgess

(57) ABSTRACT

An apparatus in an example comprises an RDMA (Remote Direct Memory Access) network adapter located at an interface of a requester node coherency domain that sends an RDMA read request to a responder node coherency domain to flush into the responder node coherency domain data previously sent by the RDMA network adapter.

14 Claims, 10 Drawing Sheets

OTHER PUBLICATIONS

The End-to-End Argument.
J. Pinkerton, "The Case for RDMA," RDMA Consortium, May 29, 2002.
"What is Middleware", ObjectWeb.org.
"InfiniBand", Wikipedia.org.
"IWarp", Wikipedia.org.
iWarp Project.
"Middleware".
"Network card", Wikipedia.org.
C. Bestler et al., "Next Steps for iWARP".
2.3 Dequeue.

* cited by examiner

FIG. 11

1102
SESSION IS CHECKED IF IMPACTED BY THE FAILED LOCAL ADAPTER.
1104

↓

IF LOCAL ADAPTER FAILURE, WAIT FOR APPLICATION SESSION TO STOP ACCESSING ADAPTER, PUT THE APPLICATION TO SLEEP. DRAIN EACH CQ, MOVE ENTRIES TO A FIRST-LEVEL SOFTWARE CQ. IF MEMORY WINDOW BINDS COMPLETE, RE-BIND RELIABLY ON THE BACKUP QP. SET AND REPORT LAST_RELIABLY_SENT_MSGID AND LAST_RELIABLY_RECEIVED_MSGID FOR EACH CONNECTION TO THE REMOTE NODE IN REPORT1.
1106

↓

UPON RECEIVING REPORT1 FROM REMOTE NODE FOR A CONNECTION,

IF REPORT1 UNSENT, DRAIN CQS, MOVE ENTRIES TO FIRST-LEVEL CQ. IF MEMORY WINDOW BINDS COMPLETE, RE-BIND RELIABLY ON THE BACKUP QP. SET LAST_RELIABLY_SENT_MSGID AND LAST_RELIABLY_RECEIVED_MSGID FOR THE CONNECTION.

IF LAST_RELIABLY_SENT_MSGID IN REPORT1 EXCEEDS LAST_RELIABLY_RECEIVED_MSGID, USE RECEIVE BUFFER HEADERS TO RECONSTRUCT RECEIVE COMPLETIONS ON FIRST-LEVEL CQ. UPDATE LAST_RELIABLY_RECEIVED_MSGID. REPOST UNSATISFIED QP RECEIVES ON THE CORRESPONDING BACKUP QP. IF LOCAL ADAPTER FAILURE, REPOST UNSATISFIED SRQ ON BACKUP SRQ IF LAST QP TO MIGRATE. ELSE, MARK OLD PRIMARY QP'S RECEIVE QUEUE STALE. IF LAST_RELIABLY_RECEIVED_MSGID IN REPORT1 EXCEEDS LAST_RELIABLY_SENT_MSGID, CREATE SOFTWARE COMPLETIONS FOR THE NEWLY COMPLETED SENDS ON THE FIRST-LEVEL CQ. UPDATE LAST_RELIABLY_SENT_MSGID. FOR UNCOMPLETED BINDS POSTED PRIOR TO THE COMPLETED SENDS, CREATE SOFTWARE COMPLETIONS AND RE-BIND RELIABLY ON THE BACKUP QPS. IF REMOTE FAILURE ONLY, MARK OLD PRIMARY QP'S SEND QUEUE STALE. IF REPORT1 SENT, REPOST MESSAGES WITH MSGID LESS THAN LAST_RELIABLY_SENT_MSGID ON THE BACKUP QP, REPORT MIGRATED MESSAGE TO THE REMOTE NODE. ELSE REPORT TO THE REMOTE NODE LAST_RELIABLY_SENT_MSGID AND LAST_RELIABLY_RECEIVED_MSGID IN REPORT1.
1114

↓

UPON REPORTING OR RECEIVING MIGRATED MESSAGE, REPOST UNCOMPLETED SENDS ON BACKUP QP. IF ALL CONNECTIONS MIGRATED, WAKE UP SESSION APPLICATION, DECLARE SESSION MIGRATED.
1116

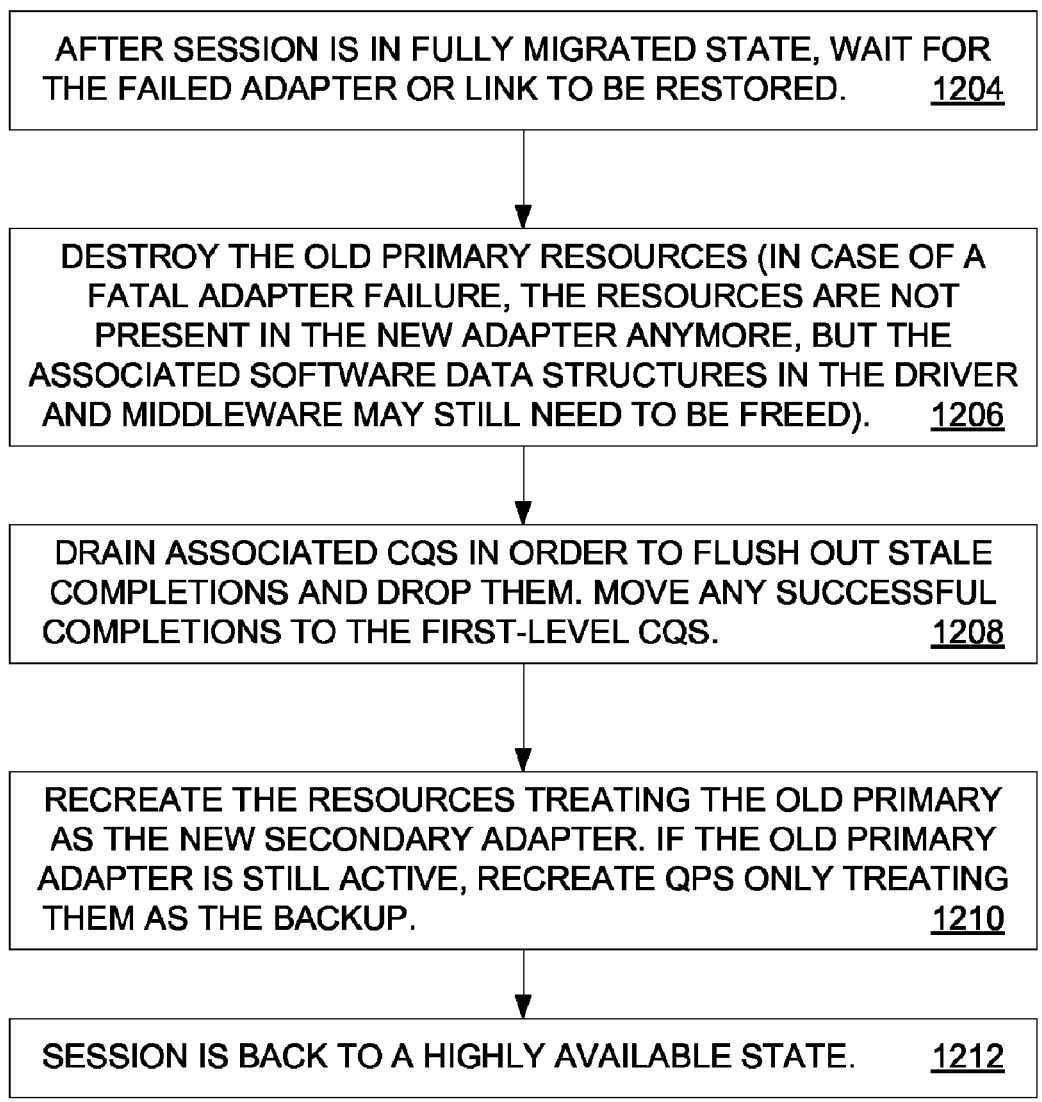

US 8,244,825 B2

REMOTE DIRECT MEMORY ACCESS (RDMA) COMPLETION

BACKGROUND

RDMA (Remote Direct Memory Access) technology allows accessing of memory on a remote system in which the local system specifies the remote location of the data to be transferred. Employing an RDMA Network Interface Controller (RNIC) on the remote system allows the access to take place without interrupting the processing of the CPU(s) on the system. An RNIC comprises a network I/O adapter or embedded controller, for example, with iWARP and Verbs functionality.

DESCRIPTION OF THE DRAWINGS

Features of exemplary implementations of the invention will become apparent from the description, the claims, and the accompanying drawings in which:

FIG. 11 is a representation of an exemplary logic flow for exemplary session fail-over of an implementation of the apparatus of FIG. 1.

FIG. 12 is a representation of an exemplary logic flow for exemplary preparation for subsequent failure of a session of an implementation of the apparatus of FIG. 1.

DETAILED DESCRIPTION

Referring to the BACKGROUND section above, an exemplary recovery approach and/or scheme serves to recover all RDMA (Remote Direct Memory Access) connections from RDMA adapter failures. An exemplary recovery is transparent to applications using RDMA. An exemplary implementation works for multiple types of RDMA devices, for example, InfiniBand (e.g., available through the InfiniBand® Trade Association; www.infinibandta.org) and RDMA-over-Ethernet (iWARP; www.rdmaconsortium.org) devices.

Figure 1:
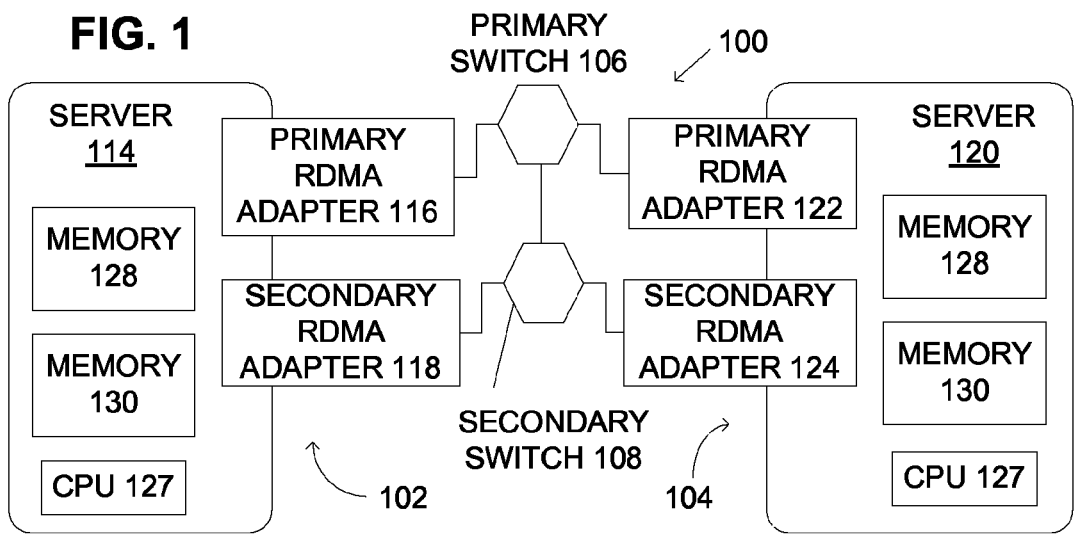
FIG. 1 is a representation of an implementation of an apparatus according to a preferred embodiment of the invention that comprises a plurality of nodes and a plurality of switches.
Figure 2:
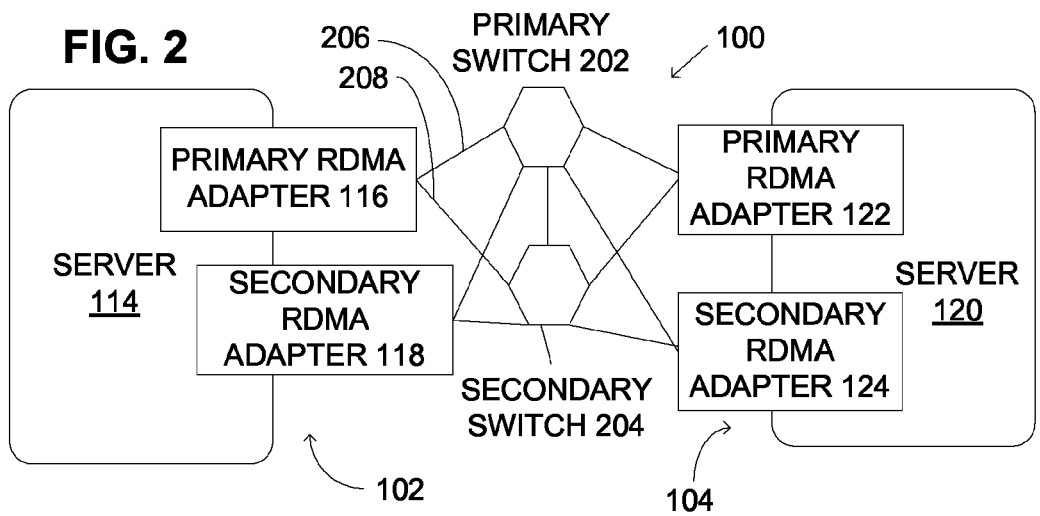
FIG. 2 is a representation of another implementation of the apparatus of FIG. 1 according to a preferred embodiment of the invention that comprises a plurality of nodes and a plurality of switches.
Figure 3:
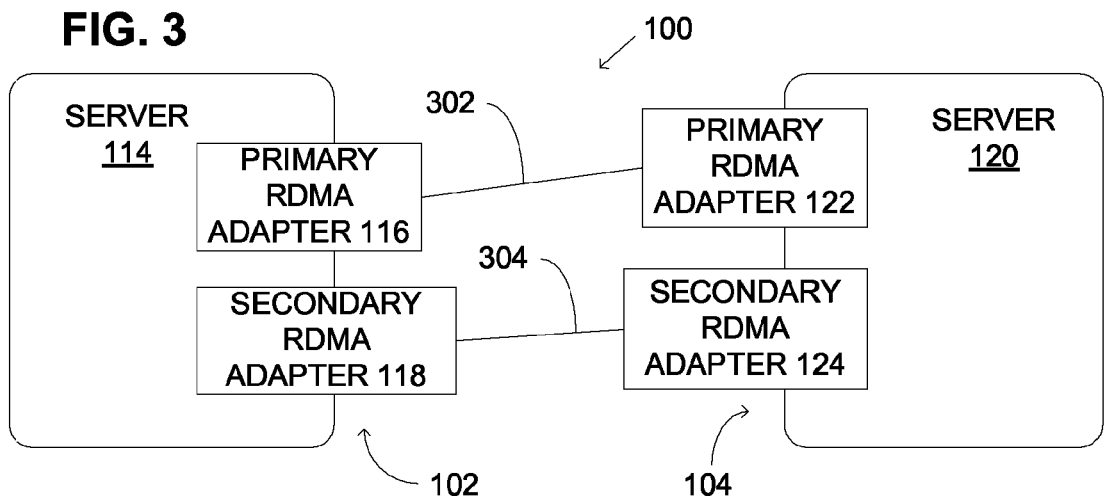
FIG. 3 is a representation of yet another implementation of the apparatus of FIG. 1 according to a preferred embodiment of the invention that comprises a plurality of nodes and zero switches.

Turning to FIGS. 1 through 3, a plurality of exemplary implementations of an apparatus 100 comprise exemplary communication and/or network fabrics and/or topologies. An exemplary fabric comprises links, switches, and routers that connect a set of nodes with RDMA (Remote Direct Memory Access) protocol implementations. The exemplary implementations of FIGS. 1 and 2 in an example may be considered to comprise non-point-to-point and/or switched topologies. The exemplary implementation of FIG. 3 is an example may be considered to comprise a point-to-point and/or switchless topology. The apparatus 100 in an example comprises a plurality of nodes such as nodes 102 and 104 and zero or more switches such as no switches or switches 106, 108, 202, and/or 204. An exemplary topology of the apparatus 100 provides a redundant fabric to any node in the apparatus 100. An exemplary fail-over automatically switches over to a redundancy upon failure of an element in the primary fabric.

The node 102 in an example comprises a server 114 and a plurality of adapters such as a primary RDMA adapter 116 and a secondary RDMA adapter 118. The node 104 in an example comprises a server 120 and a plurality of adapters such as a primary RDMA adapter 122 and a secondary RDMA adapter 124. An exemplary RDMA adapter comprises a network card, network adapter, and/or NIC (network interface card and/or controller). For example, the RDMA adapters 116, 118, 122, 124 comprise RDMA Network Interface Controllers (RNICs). Exemplary servers 114, 120 in an example comprise one or more processors such as CPUs (central processing units) 127 and one or more memories such as memories 128 and/or 130. The memory 128 in an example stores computer programs. The memory 130 in an example comprises data storage. An exemplary memory 130 is accessible through RDMA operations. The memories 128, 130 in an example comprise contiguous memory and/or partitions of a same memory on a server 114, 120.

In one or more exemplary implementations, one or more features described herein in connection with one or more of the nodes 102 and/or 104 and/or one or more parts thereof apply and/or are extendible analogously to the other and/or one or more other instances of nodes in the apparatus 100. In one or more exemplary implementations, one or more features described herein in connection with one or more of the switches 106, 108, 202, and/or 204 and/or one or more parts thereof apply and/or are extendible analogously to one or more of the others and/or one or more other instances of switches in the apparatus 100. In one or more exemplary implementations, one or more features described herein in connection with one or more of the servers 114 and/or 120 and/or one or more parts thereof apply and/or are extendible analogously to the other and/or one or more other instances of servers in the apparatus 100. In one or more exemplary implementations, one or more features described herein in connection with one or more of the adapters 116, 118, 122, and/or 124 and/or one or more parts thereof apply and/or are extendible analogously to one or more of the others and/or one or more other instances of servers in the apparatus 100. In one or more exemplary implementations, one or more features described herein in connection with one or more of the memories 128 and/or 130 and/or one or more parts thereof apply and/or are extendible analogously to the other and/or one or more other instances of memories in the apparatus 100. In one or more exemplary implementations, one or more features described herein in connection with one or more of the RDMA applications 402 (FIG. 4) and/or one or more parts thereof apply and/or are extendible analogously to the other and/or one or more other instances of RDMA applications in the apparatus 100

Exemplary adapters 116, 118, 122, and/or 124 may serve as a requester and/or responder. A requester in an example comprises an adapter that initiates an operation such as a Send, an RDMA-write or an RDMA-read. A responder in the example comprises the adapter that receives the message sent by the requester. An exemplary perspective on an operation may consider an adapter 116, 118, 122, 124 local or remote. A requester in an example may be local if a scenario is viewed by the requester. A requester in an example may be remote if a scenario is viewed by the responder. A responder in an example may be local if a scenario is viewed by the responder. A responder in an example may be remote if a scenario is viewed by the requester.

Figure 4:
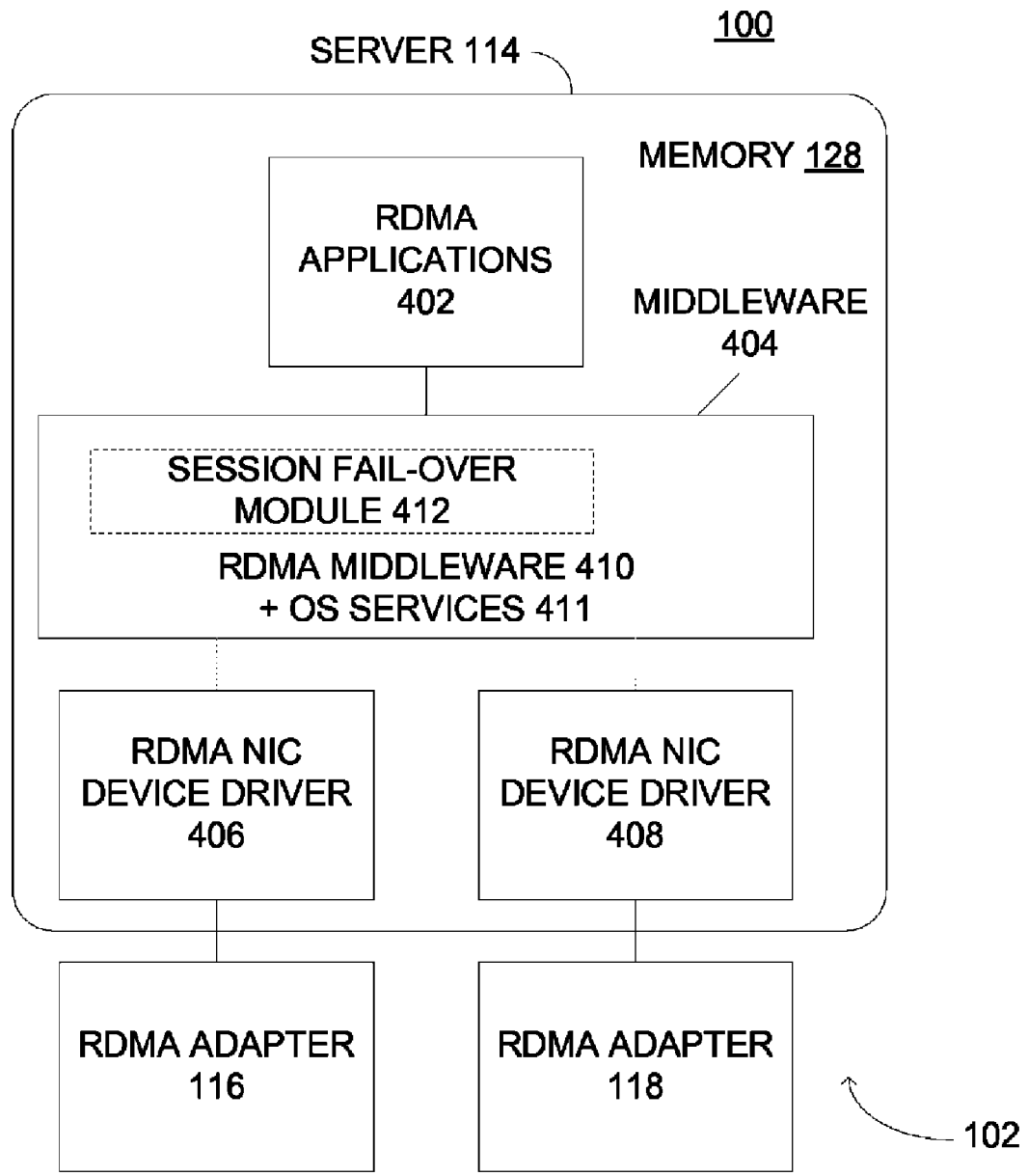
FIG. 4 is a representation of an exemplary server and a plurality of exemplary adapters of an exemplary node of the apparatus of FIG. 1 and illustrates one or more RDMA (Remote Direct Memory Access) applications, middleware, and a plurality of drivers.

Turning to FIG. 4, an exemplary server 114 comprises memory 128 that comprises one or more RDMA algorithms, procedures, programs, processes, mechanisms, coordinators, modules, codes, logics, and/or applications 402, middleware 404, and a plurality of drivers such as RDMA NIC device drivers 406 and 408. An exemplary RDMA application 402 may be implemented as kernel-resident and/or operation-system-resident logic and/or may comprise user-level programs, for example, user interface logic residing in user-level program files with additional and/or remaining logic residing in the kernel and/or underlying operating system.

Exemplary middleware 404 comprises RDMA middleware 410 and operating system (OS) services 411. In one example, the middleware 404 may comprise session fail-over coordinator, algorithm, code, computer program, computer process, computer procedure, mechanism, application, logic, and/or module 412. For example, the session fail-over module 412 comprises a modification and/or an add-on software module to the middleware 404 in an existing RDMA stack. In another example, the session fail-over module 412 interacts with the middleware 404, for example, in any manner as long as the session fail-over module 412 is transparent to the RDMA application 402 and the RDMA application 402 continues working, for example, without modification, whether or not the session fail-over module 412 is present in the middleware 404. An exemplary session fail-over module 412 may be implemented as kernel-resident and/or operating-system-resident logic and/or may comprise user-level programs, for example user interface logic residing in user-level program files with additional and/or remaining logic residing in the kernel and/or underlying operating system. In an exemplary implementation, a precise location of the session fail-over module 412 may depend on the location of the RDMA applications 402 and/or a policy decision and/or any policy decision made in the middleware 404. In an exemplary implementation, all systems and/or components participating in an exemplary fail-over solution comprise the session fail-over module 412, for example, they have the session fail-over module 412 installed thereon.

An exemplary session fail-over module 412 need not have device-dependent and/or specific knowledge and/or information, for example, with respect to the RDMA adapter 116, 118, 122, 124. In a further exemplary session fail-over module 412, a number of enhancements and/or optimizations are possible, for example, through knowledge of the RDMA adapter 116, 118, 122, 124. For example, if the session fail-over module 412 has control over Steering Tag (STag), or Rkey in InfiniBand, it may be desirable and/or easier to allocate identical values for the target memory buffer handle provided to the primary and secondary adapters 116, 118, respectively.

Figure 6:
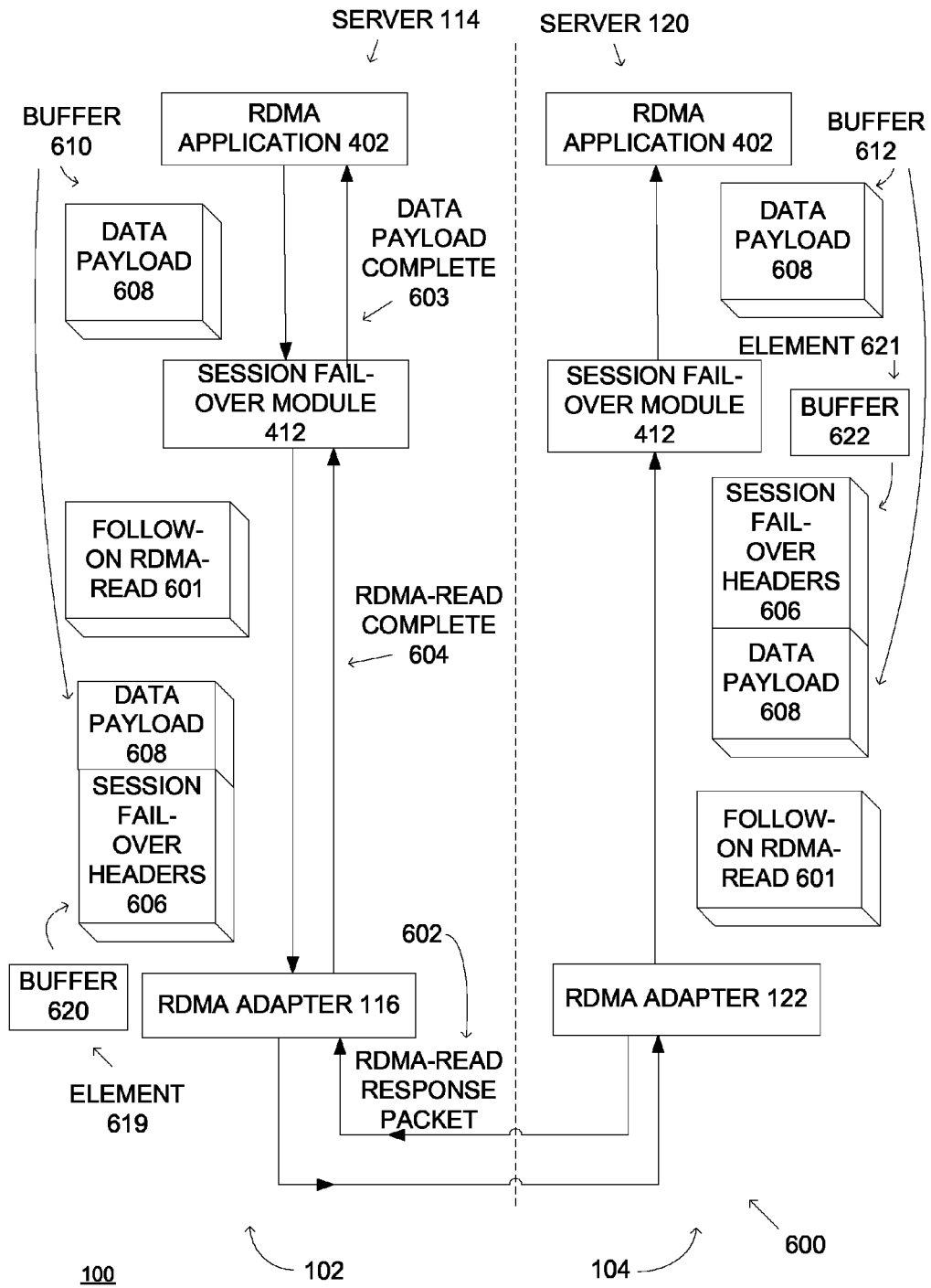
FIG. 6 is a representation of an exemplary communication flow for exemplary session fail-over in an implementation of the apparatus of FIG. 1.

Referring to FIGS. 4 and 6, an exemplary Steering Tag (STag) comprises a handle that is employable to identify a memory buffer 610, 612 that is a target of placement of a data payload 608. For example, the memory 128 on the server 114 comprises the memory buffer 610 and the memory 128 on the server 120 comprises the memory buffer 612. A tagged message in an example references a handle such as the Steering Tag (STag). An exemplary handle comprises a type of smart pointer.

An exemplary STag comprises an identifier of a Memory Window or Memory Region. The STag in an example comprises an STag Index and an STag Key. The Consumer in an example forms the STag by combining the Stag Index with the STag Key. An exemplary STag Key comprises the least significant eight bit portion of an STag. This field of an STag in an example may be set to any value by the Consumer when performing a Memory Registration operation, such as Bind Memory Window, Fast-Register Memory Region, and Register Memory Region. An exemplary STag Index comprises the most significant twenty-four bits of an STag. This field of the STag in an example is managed by the RDMA Network Interface Controller (RNIC) Interface (RI), for example, the RDMA adapters 116, 118, 122, 124, and is treated as an opaque object by the Consumer. The Consumer in an example comprises a software process that communicates using RDMA Verbs, for example, to interact with the functionality of the RNIC Interface. An exemplary Consumer comprises an application program or an operating system (OS) adaptation layer such as in the memory 128, which provides some API (application programming interface).

STags in an example are employable to access memory on any system, for example, local or remote. In an exemplary RDMA send, the requester does not reference STag of the receive buffer on a different system. The responding RDMA adapter is presented with a set of receive buffers including their associated STags by the RDMA application 402 on the responding node. Upon receiving the requester's data, the responding RDMA adapter uses the STag of a receive buffer among the buffers posted by the RDMA application 402 to locate the receive buffer and write the data to it, for example, in an untagged message from the requester. In an exemplary RDMA-write, the requester does directly reference the STag of the remote buffer. The remote RDMA adapter simply uses the STag passed by the requester to locate and write to the buffer, for example, in a tagged message. In an exemplary RDMA-read, the requester does directly reference the STag of the remote buffer. The remote RDMA adapter simply uses the STag passed by the requester to locate and read from the buffer, for example, in a tagged message. In an exemplary RDMA send or an exemplary RDMA-write, the requester is presented with the STag of the buffer to send data from the RDMA application 402 on the requesting node. In an exemplary RDMA-read, the requester is presented by the RDMA application 402 on the requesting node with the STag of a buffer to receive the data read from the remote buffer.

For an exemplary RDMA-write operation from the server 114 to the server 120, the STag and/or handle is employable in an example when an application such as the RDMA application 402 on the server 114 references blocks of memory 128 or objects managed by another system and/or server, for example, the server 120. The RDMA application 402 on the server 120 in an example receives the data payload 608 from the memory buffer 610 on the server 114 into the memory buffer 612 on the server 120. The RDMA application 402 such as the one in the server 120 in an example receives from the RDMA NIC device driver on the server 120 an STag value for a specific memory buffer 612 mapped on the RDMA adapter 122 of the server 120 that is to receive the data payload 608 from the memory buffer 610 on the server 114 into the memory buffer 612 on the server 120. The RDMA application 402 on the server 120 communicates the STag to the RDMA application 402 on the server 114, for example, via an application-specific technique and/or approach, as will be understood by those skilled in the art. The RDMA application 402 located on the server 114 in an example initiates an RDMA-write operation that sends the data with specification of the STag value to target the memory buffer 612 on the server 120.

For an exemplary read operation by the server 114 from the server 120, the STag and/or handle is employable in an example when an application such as the RDMA application 402 on the server 114 references blocks of memory 128 or objects managed by another system and/or server, for example, the server 114. The RDMA application 402 on the server 114 in an example receives the data payload 608 into the memory buffer 610 on the server 114 from the memory buffer 612 on the server 120. The RDMA application 402 such as the one in the server 120 in an example receives from the RDMA device driver on the server 120 an STag value for a specific memory buffer 612 mapped on the RDMA adapter 122 of the server 120 in order to prepare for getting the data payload 608 into the memory buffer 610 on the server 114 from the memory buffer 612 on the server 120. The RDMA application 402 on the server 120 communicates the STag to the RDMA application 402 on the server 114, for example, via an application-specific technique and/or approach, as will be understood by those skilled in the art. The RDMA application 402 located on the server 114 in an example initiates an RDMA operation that sends the RDMA read request with specification of the STag value to target the memory buffer 612 on the server 120.

An exemplary session fail-over module 412 vitalizes the RDMA adapters 122 and 124 and presents as one single RDMA adapter to the RDMA application 402. The RDMA application 402 such as the one in the server 120 in an example receives from the session fail-over module 412 a single value of STag for a specific memory region mapped on both the RDMA adapters 122 and 124. The session fail-over module 412 maps the region on both the primary adapter 122 and the secondary adapter 124. The RDMA application 402 in server 120 communicates this STag to a remote RDMA application 402 such as the one in the server 114. The remote RDMA application 402 in an example initiates an RDMA operation specifying the STag to target the associated memory region such as the buffer 610 in the server 120. An exemplary rationale and/or benefit of keeping the STag as seen by the RDMA application 402 unchanged in an example is to ensure the RDMA application 402 is unaware of the fail-over. An exemplary RDMA device driver instances 406, 408 on the server 120 provide identical STag values to the session fail-over module 412 for the region mapped on the primary adapter 122 and the secondary adapter 124 so that the exemplary session fail-over module 412 simply relays the STag to the RDMA application 402.

In exemplary contrast, if the actual STag values programmed into the RDMA adapters 122, 124 are different in an example then only one STag value would be returned to the RDMA application 402 in an exemplary transparent implementation by the session fail-over module 412. The session fail-over module 412 in the server 114 in an example would need to translate the STag to the right value depending on which RDMA adapter 122 or 124 is in use for the connection.

STag in an example may be used by an RDMA adapter on the responder node 104. STag as seen by an RDMA application 402 may comprise an identical or single value, for example, to promote and/or guarantee transparency to the RDMA application 402. An exemplary session fail-over module 412 in an example may accomplish and/or promote transparency to the RDMA application 402 by using the identical or single on both a primary responder RDMA adapter and a secondary responder RDMA adapter, for example, with help of RDMA device knowledge. In another example, the session fail-over module 412 may accomplish and/or promote transparency to the RDMA application 402 by using two STag values, one on the primary responder and another on the secondary responder. For example, the requester session fail-over module 412 may translate the single value for STag passed by the requester-node RDMA application 402 into the appropriate value, for example, depending on whether the primary responder or secondary responder is used.

Figure 5:
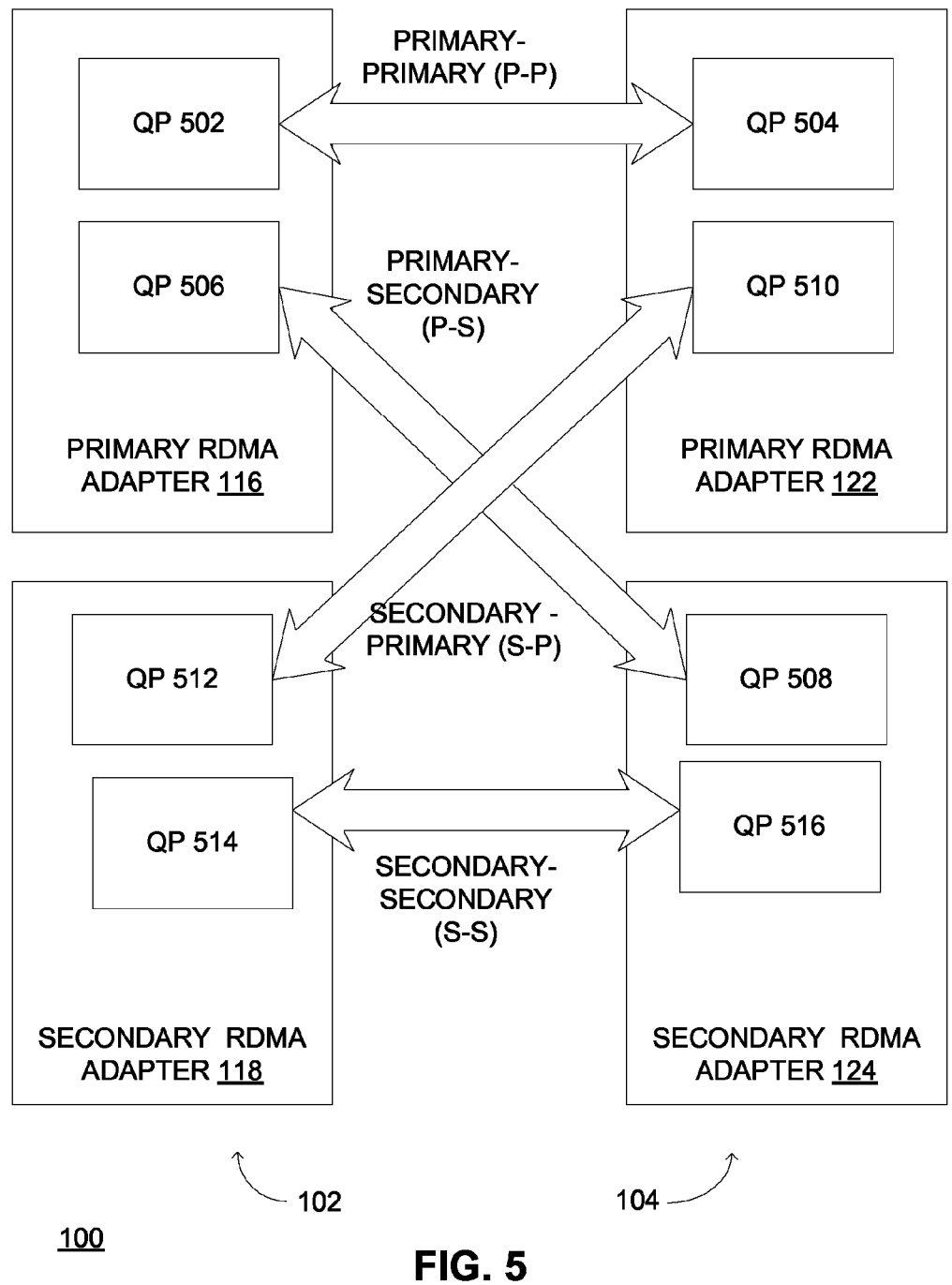
FIG. 5 is a representation of a plurality of exemplary adapters of exemplary nodes of the apparatus of FIG. 1 and illustrates an exemplary RDMA connection that employs any two of the adapters to comprise two Queue Pairs (QPs).

Turning to FIG. 5, an exemplary RDMA connection using any two of the RDMA adapters 116, 118, 122, 124 comprises two Queue Pairs (QPs). The two QPs comprise a QP on the RDMA adapter such as the RDMA adapter 116 and a QP on the RDMA adapter such as the RDMA adapter 122. The QPs in an example are associated with each other by a standard connection establishment protocol. The two QPs in an example allow the Consumer such as the RDMA application 402 on the node 102 to interact with the Consumer such as the RDMA application 402 on the node 104. The two queues as the pair in an exemplary QP comprise the Send Queue (SQ) and the Receive Queue (RQ). Each queue in an example stores a Work Queue Element from the time the Work Queue Element is posted until the time the Work Queue Element is completed. An exemplary Send Queue (SQ) comprises PostSQ Work Queue Elements that have specific operation types, such as Send Type, RDMA Write, or RDMA Read Type Operations, as well as STag operations such as Bind and Invalidate. An exemplary Receive Queue (RQ) comprises Work Queue Elements that describe the Buffers into which data from incoming Send Operation Types may be placed.

An exemplary QP is present on each of two communicating RDMA adapters 116, 118, 122, 124. QP 502 is present on the adapter 116 and in an example communicates with QP 504 present on the adapter 122. QP 506 is present on the adapter 116 and in an example communicates with QP 508 present on the adapter 124. QP 510 is present on the adapter 122 and in an example communicates with QP 512 present on the adapter 118. QP 514 is present on the adapter 118 and in an example communicates with QP 516 present on the adapter 124. An RDMA connection in an example comprises a pair of communicating QPs such as QP 502 and QP 504. Once an RDMA connection exists between two adapters, the connection in an example eventually times out or dies when one of the adapters fails. An exemplary implementation pre-creates a set of backup QPs using the secondary adapters, and migrates the traffic onto the secondary adapters, for example, as a backup, if one of the primary adapters should fail. An exemplary RDMA session comprises a primary and a few backup QPs for every user-requested connection, as described herein. The number of connections may vary by topology. Resources other than QPs in an example may also be duplicated.

Referring to FIGS. 4 and 6, adapter failures, particularly the ones that are fatal, in an example may cause the host software and/or any component outside the domain of the RDMA adapter such as the middleware 404 or RDMA device driver 406, 408 on the server 114, 120, to lose the precise state of the failed adapter. Without an upper-level protocol, it may be difficult and/or impossible in an example for the host to match the data sent and data received. The session fail-over module 412 in an example provides, inserts, and/or injects an RDMA-read 601 following every Send operation from the RDMA application 402, for example, to flush the data on the responder and/or remote coherency domain. For example, the session fail-over module 412 on the server 114 provides, inserts, and/or injects an RDMA-read 601 following every Send operation from the RDMA application 402 to the RDMA application 402 on the server 120 to flush the data all the way up into the coherency domain of the server 120.

An exemplary coherency domain is one where the participating components in a server 114 see coherent read and write of data from all the components. For example, the CPUs 127 on the nodes 102 in a cache-coherent system do not have a data integrity problem if one CPU 127 wrote some data to part of the memory 130 while the other CPU(s) 127 had a copy of a previous version of the data in their cache, for example, as additional parts of the memory 130. The other CPU(s) 127 would learn of the update automatically. An exemplary way of handling this situation is to invalidate the other caches so at the next review or access of the data, the CPUs 127 fetch the data from the location of the data in the memory 130.

In an exemplary context of a fabric of coherent systems interconnected by RDMA hardware, and RDMA-write or send from the server 114 to the server 120 is not coherent. As an illustration of exemplary incoherency, the server 114 could consider the operation done when the server 120 may not yet have seen the update from the server 114. The RDMA adapter 122 on the server 120 in an example may fail to notify the server 120 of the receipt of the data from the server 114 by the time the server 114 considers the operation done, making the server 120 go out of synchronization and/or coordination with the server 114, for example, with respect to some data. The standard RDMA protocols do not require that the operations be coherent. A completion notification 604 of a subsequent RDMA-read operation 601 in an example guarantees the data associated with the RDMA-write or Send operation reached the coherency domain of the responding server 120. The session fail-over module 412 on the node 102 in an example interprets the RDMA-read completion 604 following an indication of acknowledgement of the RDMA-read operation 601 from the RDMA adapter 122 on the node 104 and as a guarantee of delivery of the data previously sent with the RDMA-write or Send operation from the node 102 to the node 104. The RDMA-read completion 604 in an example comprises a transport-level acknowledgement of completion of the RDMA read operation 601. An exemplary interpretation by the session fail-over module 412 of the RDMA-read completion 604 as an acknowledgement of the RDMA read request serves as a substitute for an absent protocol in the standard RDMA protocols that would otherwise guarantee delivery of the previously send data to the remote coherency domain by an indication from the remote coherency domain of direct acknowledgement of the sent data.

In an exemplary implementation, the requester RDMA adapter 116 does not assume the Send operation is done until the completion notification 604 of the following RDMA-read 601 is received from the responder RDMA adapter 122. A receive completion notification associated with the Send operation in an example is posted on the responding node 104 by the responding adapter 122. This receive completion notification for the Send operation in an example may not be posted immediately and may potentially happen after sending acknowledgement for the Send operation as well as response to the following RDMA-read operation to the requesting adapter 116 as the RDMA-read completion 604. While the requester node 102 can tell from the RDMA-read completion 604 that the data from the Send operation was placed in the memory 130 of the responder node 104, the requester node 102 in an example cannot guarantee the receive completion associated with the Send Queue operation was also placed in the memory 130 of the responder node 104 because the responding adapter 122 could have failed and/or died after placing the data associated with the Send Queue operation but prior to writing the receive completion associated with the Send Queue operation. To notify the responder-side RDMA application 402 on the node 104 of the data received from the Send operation, responder-side middleware 404 on the node 104 in an example reconstructs the receive completion associated with the Send operation from a special header, for example, a session fail-over header 606 added and/or attached to the beginning and/or front of the Send message by the requester-side middleware 404 on the node 102. Additional exemplary description of the session fail-over header 606 is presented herein.

Referring to FIG. 1, primary and secondary adapters 116, 118, 122, 124 are connected to two different switches 106, 108 providing divergent paths through the fabric. If one switch 106 fails, the secondary adapters 118, 124 and the secondary switch 108 take over. An exemplary implementation comprises a backup RDMA connection between the secondary adapters 118, 124. If a link between a primary adapter 116 and the primary switch 106 fails or the primary adapter 116 fails in an example the secondary adapter 118 takes over on that node 102 while the primary adapter 122 is still used on the node 104 that did not lose the link. An exemplary implementation comprises two additional backup connections. A first exemplary backup connection occurs between the adapters 118 and 122, for example, to take care of failure of the primary adapter 116 on the server 114. A second exemplary backup connection occurs between the adapters 116 and 124, for example, to take care of failure of the primary adapter 122 on the server 120. These additional backup connections in an example communicate via the inter-switch links between the switches 106 and 108. An exemplary implementation comprises the primary-primary connection between the adapters 116 and 122 for normal operation. An exemplary implementation comprises a total of four connections for every user-requested connection, for example, adapter 116 to adapter 122, adapter 116 to adapter 124, adapter 118 to adapter 122, and adapter 118 to adapter 124. More than one pair of primary and secondary adapters in an example can be connected in a similar and/or analogous fashion, for example, to meet increased bandwidth requirements.

An exemplary implementation distributes the load by assigning the different primary RDMA adapters to different instances of RDMA applications 402. For example, if sixteen instances of an RDMA application 402 are present in a server 114 with four pairs of primary and secondary adapters, each pair of adapters in an example can be used by every four instances of the RDMA application 402. Similar and/or analogous distribution may be achieved on other servers such as 120 as well. Because of the full connectivity in a switched topology, any instance of an RDMA application 402 on any node 102, 104 in an example is able to talk to any other instance of the RDMA application 402 on any other node 102, 104.

Referring to FIG. 2, an exemplary implementation employs two-ported adapters 116, 118, 122, 124. Primary and secondary ports 206, 208 of each adapter 116, 118, 122, 124 in an example are connected to two switches 202, 204, for example, providing divergent paths through the fabric. If one switch 202, 204 fails or a link or port 206 between a primary adapter 116, 122 and the primary switch 202 fails, the secondary ports 208 take over, for example, through employment of Auto Port and/or Path Migration (APM) on InfiniBand (IB) or an implementation of an automatic port migration on iWARP. If the primary adapter 116 fails in an example the secondary adapter 118 takes over on that node 102 while the primary 122 adapter is still used on the node 104 that did not see adapter failure.

Referring to FIG. 3, primary and secondary adapters 116, 118, 122, 124 are connected in a point-to-point and/or switchless topology and/or fashion, for example, providing divergent paths. If primary link 302 fails or the primary adapter 116, 122 fails, the secondary adapters 118, 124 take over on secondary link 304. More than one pair of primary and secondary adapters can be connected in a similar and/or analogous point-to-point and/or switchless topology and/or fashion, for example, to meet increased bandwidth requirements, for example, as traffic is distributed on more adapters. Unlike switched topologies, an exemplary implementation omits full connectivity of any adapter being able to talk to any other adapter in the fabric. For example, all resources for an application instance cannot be created in a single adapter hoping any remote application instance in the fabric will be able to communicate with the single adapter. Owing to this constraint, a middleware implementation lacking a special mechanism of binding RDMA applications to multiple RDMA adapters would not be able to distribute the traffic from more than one instance of an RDMA application 402 over multiple active adapters such as 116, 118 on the server 114 for example, limiting the maximum achievable bandwidth to the capacity of one RDMA adapter.

In an exemplary implementation, therefore, most of the resources such as Protection Domain (PD), Memory Region/Window (MR/MW), Completion Queue (CQ), are multiple present on all adapters in the system. The multiple CQs in an example are aggregated into a higher-level software completion queue for the RDMA application 402 to think there is one virtual CQ. For exemplary communication between a local RDMA application 402 and a remote RDMA application 402, their respective QPs need to be present on the adapters that are physically connected. However, an exemplary Shared Receive Queue (SRQ) in an example cannot be meaningfully partitioned across the adapters without making the RDMA application 402 aware of the presence of multiple adapters. An exemplary perspective may consider an RDMA application 402 (FIG. 4) local or remote.

An illustrative description of an exemplary perspective of an RDMA application 402 located on the server 114 as local and an RDMA application 402 located on the server 120 as remote is presented herein, for explanatory purposes. When an application's SRQ is resident on an adapter in an example all the QPs tied to the SRQ are also resident on the same adapter. This basically and/or largely determines the remote adapter on which the QP counterparts are resident for the same connection. In an example, if local RDMA application 402 chose an adapter that happens to be not physically connected with an adapter that remote RDMA application 402 chose for its SRQ, then the send queue operations for a connection need follow the location of the remote process and/or RDMA application 402 rather than a locally selected location for their SRQs. An exemplary implementation employs two simplex connections for each connection sought by the RDMA application 402. If a primary adapter fails, the remote primary adapter also loses connectivity. Hence, all SRQs (and associated QPs) on the primary adapters will move to an alternate adapter. This will determine the new locations for the corresponding send queues.

Referring to FIG. 5, an exemplary connection between any two of the RDMA adapters 116, 118, 122, 124 comprises two Queue pairs (QPs), for example, one QP on each side of the connection. Exemplary Queue pairs (QPs) comprise QPs 502, 504, 506, 508, 510, 512, 514, 516. An exemplary RDMA session comprises a plurality of connections. Referring to FIG. 1, an exemplary implementation comprises four full duplex connections, for example, QP 502 to QP 504 between adapters 116 and 122, QP 506 to QP 508 between adapters 116 and 124, QP 512 to QP 510 between adapters 118 and 122, and QP 514 to QP 516 between adapters 118 and 124. Data is transferred in both directions on the same connection in an exemplary full duplex connection. Referring to FIG. 2, an exemplary implementation comprises three full duplex connections, for example, QP 502 to QP 504 between adapters 116 and 122, and QP 506 to QP 508 between adapters 116 and 124, QP 512 to QP 510 between adapters 118 and 122. The exemplary implementation presented with reference to FIG. 2 in an example omits a connection QP 514 to QP 516 between adapters 118 and 124 as unneeded, for example, because of employment of Auto Port and/or Path Migration (APM) on InfiniBand (IB) or an implementation of an automatic port migration on iWARP.

Referring to FIG. 3, an exemplary implementation comprises two dual-simplex or half-duplex connections per session. If the primary SRQ for a local RDMA application 402 is on the RDMA adapter 116 while the primary SRQ for a remote RDMA application is on the RDMA 124, there is no physical connectivity between the RDMA adapters on which the primary SRQs are resident. So, one simplex unidirectional connection from QP 504 to QP 502 for the remote RDMA application 402 to send data to the local RDMA application 402 paired with another simplex unidirectional connection from QP 514 to QP 516 for the local RDMA application 402 to send data to the remote RDMA application 402 in an example are required, desired, needed, and/or provided. For example, one simplex switchless connection comprises a local QP used as send queue and a counterpart remote QP used as receive queue, and another simplex switchless connection may comprise a local QP used as receive queue and a counterpart remote QP used as send queue. Similar and/or analogous sets of connections to the secondary RDMA adapters are required, desired, needed, and/or provided, for example, if the secondary adapters chosen for a local RDMA application 402 and a remote RDMA application 402 on the respective nodes are also not physically connected. Data is transferred in only one direction on an exemplary simplex or half-duplex connection. For exemplary communication in both directions, the two simple or half-duplex connections each carry data in one direction. An exemplary approach defers a choice of a local RDMA adapter for a QP to be used as a send queue for a local RDMA application until a time of connection establishment when a choice of a remote RDMA adapter for a QP to be used as receive queue for a remote RDMA application may be determined, selected, known, and/or identified. A choice of a local RDMA adapter for a QP to be used as receive queue for the local RDMA application in an example may also be communicated to the remote counterpart session fail-over module 412, for example, so a choice of a remote RDMA adapter for a QP to be used as send queue for the remote RDMA application may be determined, selected, known, and/or identified by the remote session fail-over module 412 Ramesh please confirm 412 is correct. The session fail-over module 412 in an example manages creating and maintaining the two simplex primary connections and two simplex secondary connections.

An exemplary local RDMA application 402 on the server 114 may need and/or desire to communicate with multiple processes on the server 120. Keeping the SRQ for the local RDMA application 402 on the RDMA adapter 118 in an example does not completely avoid a desire and/or need to create dual simplex connections with all the processes, for example, even though it does help with respect to the remote RDMA application 402 that has its SRQ on the RDMA adapter 124. In one or more exemplary situations where the communicating processes happen to have their SRQs on the RDMA adapters that are physically connected, a duplex connection may replace two simplex connections.

The number of backup resources is different, for example, depending on the type of resource and/or topology in one or more exemplary implementations. A Protection Domain (PD) in an example is employable for tracking the association of Queue Pairs (QPs), Memory Windows (MWs), and Memory Regions (MRs). PDs in an example are set by a Privileged Consumer to provide protection of one RDMA application 402 from accessing through the RNIC, the memory being used by another RDMA application 402. An exemplary Completion Queue (CQ) comprises a sharable queue that comprises one or more entries, for example, Completion Queue Entries. A CQ in an example may be employable to create a single point of completion notification for multiple Work Queues. The Work Queues associated with a Completion Queue in an example may be from different QPs, and of differing queue types (e.g., SQs or RQs). An exemplary and/or optional Shared Receive Queue (SRQ) allows the Receive Queues from multiple QPs to retrieve Receive Queue Work Queue Elements from the same shared queue as needed.

An exemplary RDMA session comprises a set of related RDMA resources owned by an instance of an RDMA application 402. For example, an RDMA session comprises a PD, all QPs, MRs, MWs and SRQs on the PD, and all CQs associated with the QPs on the PD. Depending on an exemplary usage model of an RDMA application 402, some of the resources may not be required in a session. For example, a simple session may comprise a PD, QPs, MRs, and CQs. An exemplary RDMA application 402 such as a user-level process or thread has access to a dedicated RDMA session.

An exemplary Memory Window (MW) comprises a subset of a Memory Region, for example, which may be remotely accessed in a logically contiguous fashion. A Memory Window in an example may be identified by an STag, a Base TO (tagged offset), and a length, and also may reference an underlying Memory Region and may have Access Rights. An exemplary Memory Region (MR) comprises an area of memory that the Consumer wants the RNIC to be able to locally or locally and remotely access directly, for example, in a logically contiguous fashion. A Memory Region in an example may be identified by an STag, a Base TO, and a length, and may be associated with a Physical Buffer List through the STag.

Referring to the exemplary implementations represented by FIGS. 1 and 2, upon a request by an RDMA application 402 to create an RDMA resource, exemplary duplicated resources are prepared before an adapter failure would occur. The session fail-over module 412 in an example creates two Protection Domains (PDs), for example, one on each adapter 116, 118. The session fail-over module 412 in an example creates two Completion Queues (CQs), for example, one on each adapter 116, 118. The session fail-over module 412 in an example creates two Shared Receive Queues (SRQs), for example, one on each adapter 116, 118. The session fail-over module 412 in an example creates two Memory Windows (MWs) and Memory Regions (MRs), for example, one on each adapter 116, 118. The session fail-over module 412 in an example creates Queue Pairs (QPs), for example, as described herein with reference to FIG. 5. An exemplary implementation represented by FIG. 1 may comprise four QPs and an exemplary implementation represented by FIG. 2 may comprise three QPs. For example, the remaining available network paths in the event of failure of a network component determines the need to have a connection on the paths, as will be appreciated by those skilled in the art.

Referring to the exemplary implementation represented by FIG. 3, upon a request by an RDMA application 402 to create an RDMA resource, exemplary duplicated resources are prepared before an adapter failure would occur. Analogously to the exemplary implementations represented by FIGS. 1 and 2, the session fail-over module 412 in the exemplary implementation represented by FIG. 3 in an example creates two Shared Receive Queues (SRQs), for example, one on each adapter 116, 118. In contrast to the exemplary implementations represented by FIGS. 1 and 2, the session fail-over module 412 in the exemplary implementation represented by FIG. 3 in an example creates on every adapter one each of Protection Domain (PD), Completion Queue (CQ), Memory Window (MW), and Memory Region (MR). For example, if node 102 had four RDMA adapters, a total of four PDs, four CQs, four MWs, and four MRs, one on each of adapters is created for every PD, CQ, MW, and MR, respectively, requested by the RDMA application 402. The session fail-over module 412 in an example creates Queue Pairs (QPs) as described herein with reference to FIG. 5. An exemplary implementation represented by FIG. 3 may comprise a primary simplex receive QP and a secondary simplex receive QP on the same local adapter as that of the primary SRQ and the secondary SRQ, respectively, any may reserve two other simplex send QPs, for example, deferring the adapter choice until the connection is created depending on the remote adapter chosen for the receive QPs on the connection. The local adapter to be chosen for the simplex send QPs for a connection in an example is physically connected to the remote adapter chosen for the simplex receive QPs of the remote RDMA application 402.

FIG. 6 is a representation of an exemplary communication flow 600 for exemplary session fail-over in an implementation of the apparatus 100. The communication flow 600 in an example comprises an exemplary session fail-over protocol. The session fail-over module 412 in an example performs a follow-on RDMA-read operation 601 after every Send or RDMA-write from the RDMA application 402. The follow-on RDMA-read operation 601 performed by the session fail-over module 412 is transparent to the RDMA application 402. An exemplary RDMA-read response packet 602 comprises data read from internal memory 130 exposed by the middleware 404 on the server 120 to the middleware 404 on the server 114. The session fail-over module 412 in an example notifies the RDMA application 402 of the completion 603 of the Send or RDMA-write only after receipt of the RDMA-read completion 604 by the local middleware 404.

Figure 7:
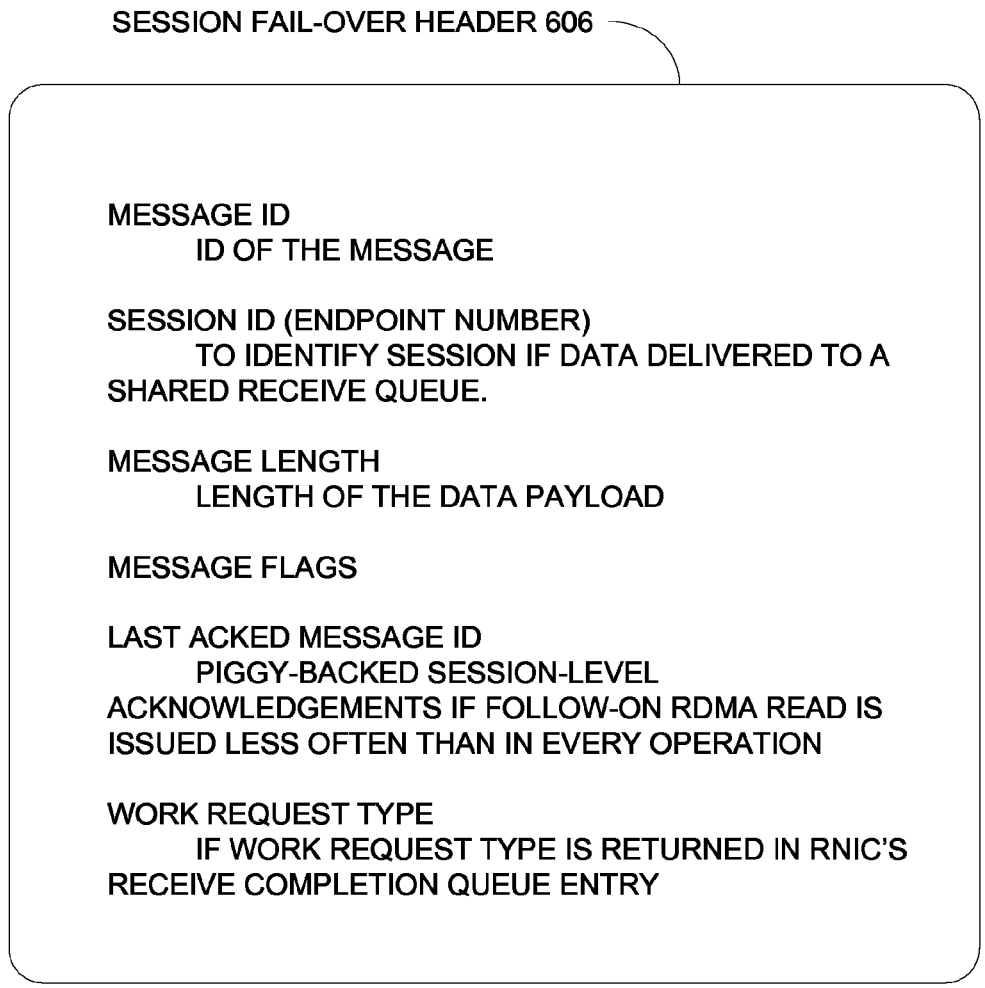
FIG. 7 is a representation of an exemplary session fail-over header that is employable in the exemplary communication flow of FIG. 6.

Referring to FIGS. 6 and 7, the session fail-over module 412 in an example adds an extra header such as session fail-over header 606. The session fail-over module 412 on the requesting node in an example adds and/or attaches the session fail-over header 606 to the beginning and/or front of the data payload 608 of the RDMA application 402, for example, through employment of an additional data gather element 619 that describes a buffer 620 receiving the session fail-over header 606. The session fail-over module 412 on the responding node in an example employs an additional data scatter element 621 that describes a buffer 622 to serve as a receive buffer area for the session fail-over header 606. The data scatter element 621 is added to the beginning and/or front of the matching receive buffer posted by the RDMA application 402 on the responding node. The session fail-over header 606 in an example is employable by the session fail-over module 412 to reconstruct a receive completion on the server 120 if the adapter 118 on the server 120 failed and/or died prior to delivering the completion notification 606 for the received data. An exemplary session fail-over header 606 comprises an exemplary total size limit of thirty-two bytes.

An exemplary session fail-over header 606 is employed only in an RDMA Send operation from the RDMA application 402 and specifically omitted in an RDMA write operation from the RDMA application 402. An exemplary rationale for omitting is to avoid writing the header information into the RDMA-write target buffer exposed and owned by the RDMA application 402 on the responding node. The RDMA-write target buffer exposed by the RDMA application 402 on the responding node in an example may not be able to accommodate both the header information and the data payload from the RDMA application 402 on the requesting node. Owing to an exemplary transparency of the session fail-over header 606 to the RDMA application 402 on the responding node, the RDMA application 402 on the responding node in an example might have allocated an RDMA-write target buffer that is large enough to hold only the data payload sent by the RDMA application 402 on the requesting node. Omitting the session fail-over header 606 in an example is acceptable in view of an exemplary absence of a requirement to generate receive completion on the responding node upon an RDMA write operation from the requesting node.

An exemplary session fail-over header 606 comprises all and/or substantially all information as in a standard receive completion associated with the Send operation. An exemplary MESSAGE ID comprises an ID of the message. An exemplary SESSION ID (ENDPOINT NUMBER) serves to identify the session if the data delivered to a Shared Receive Queue. An exemplary MESSAGE LENGTH comprises length of the data payload 608. Exemplary MESSAGE FLAGS may comprise and/or resemble standard message flags. An exemplary LAST ACKED (acknowledged) MESSAGE ID comprises piggy-backed session-level acknowledgements if follow-on RDMA read is issued less often than in every operation. An exemplary WORK REQUEST TYPE is presented if a Work Request Type is otherwise returned in the receive Completion Queue Entry of the RDMA adapter. The WORK REQUEST TYPE is set by the session fail-over module 412 prior to posting a send queue operation on the RDMA adapter and retrieved by the session fail-over module on the responding node.

Figure 8:
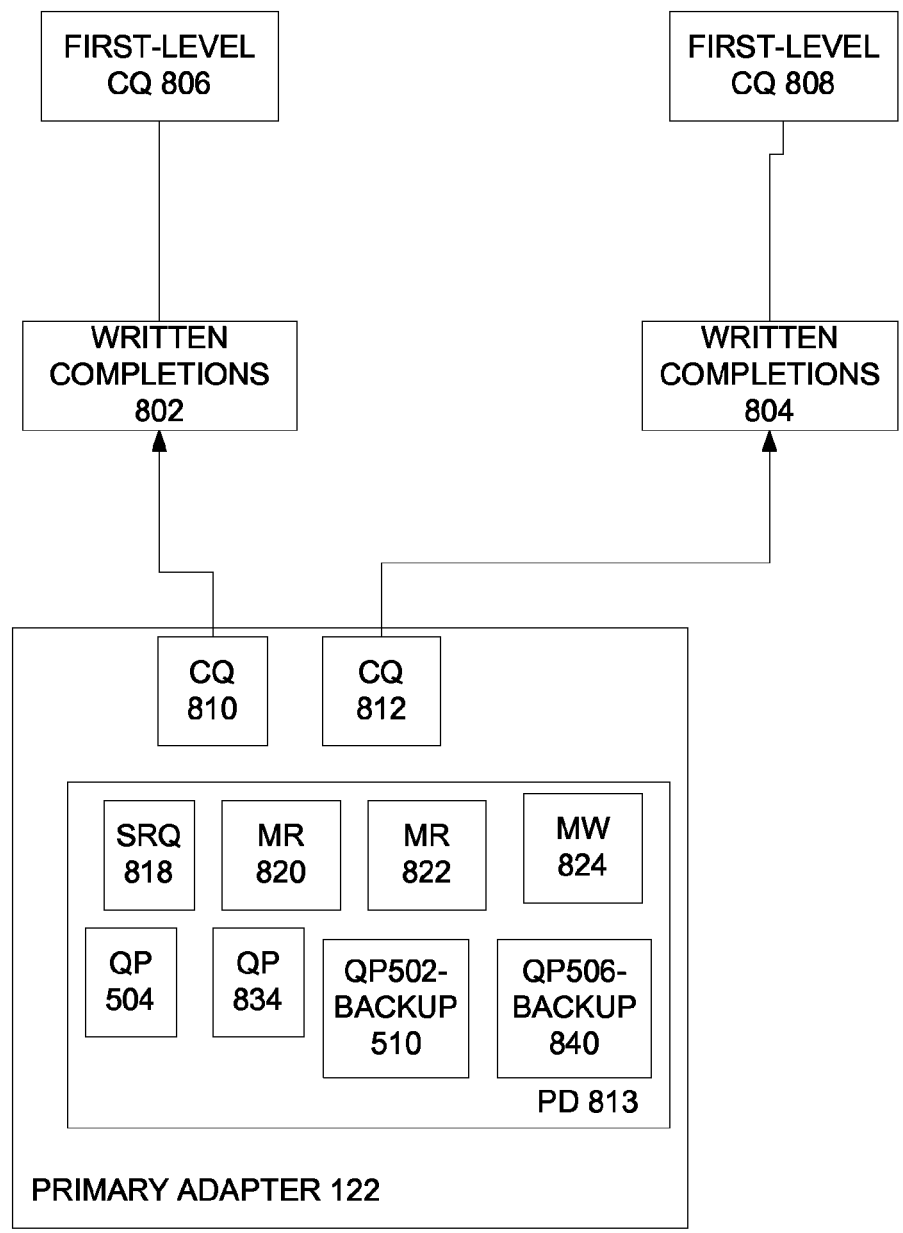
FIG. 8 is an exemplary functional block diagram of exemplary normal operation of an exemplary adapter of an exemplary node of the apparatus of FIG. 1.

FIG. 8 represent exemplary normal operation of an exemplary primary RDMA adapter 122, for example, before, failure of the primary RDMA adapter 116. The primary RDMA adapter 122 in an example writes completions 802, 804 into a predetermined region of memory on the local server 120. An exemplary session fail-over module 412 creates one or more software completion queues (CQs), for example, first-level software completion queues (CQs) 806, 808. The software CQs 806, 808 are transparent to the RDMA application 402. The session fail-over module 412 in an example associates the first-level software completion queue 806, 808 with completion queues (CQs) 810, 812 created on the primary 122. During exemplary normal operation, the first-level completion queue 806, 808 in an example should be empty. Therefore, every successful dequeue operation done by an exemplary RDMA application 402 on the node 104 should directly retrieve the completion 802, 804 written by the primary RDMA adapter 122. Every successful receive completion from a QP causes the session fail-over module 412 to update LAST_RELIABLY$_{RECEIVED}$_MSGID on the connection. Every successful send completion of the follow-on RDMA-read injected by the session fail-over module 412 on a QP causes the session fail-over module 412 to update LAST_RELIABLE_SENT_MSGID on the connection. Exemplary backup queue pairs (QPs) 504, 834, for example, on an exemplary primary RDMA adapter 122 are employable in an event of failure of the remote primary RDMA adapter 116. For example, the backup QPs 510, 840 may serve in place of the queue pairs (QPs) 504, 834 upon a failure of the primary RDMA adapter 116 on a remote node 102. An exemplary primary adapter 122 comprises completion queues (CQs) 810, 812 and protection Domain (PD) 813. An exemplary protection Domain (PD) 813 comprises Shared Receive Queue (SRQ) 818, a pair or queue pairs (QPs) 504, 834, backup QPs 510, 840, memory regions (MRs) 820, 822, and memory window (MW) 824.

Figure 9:
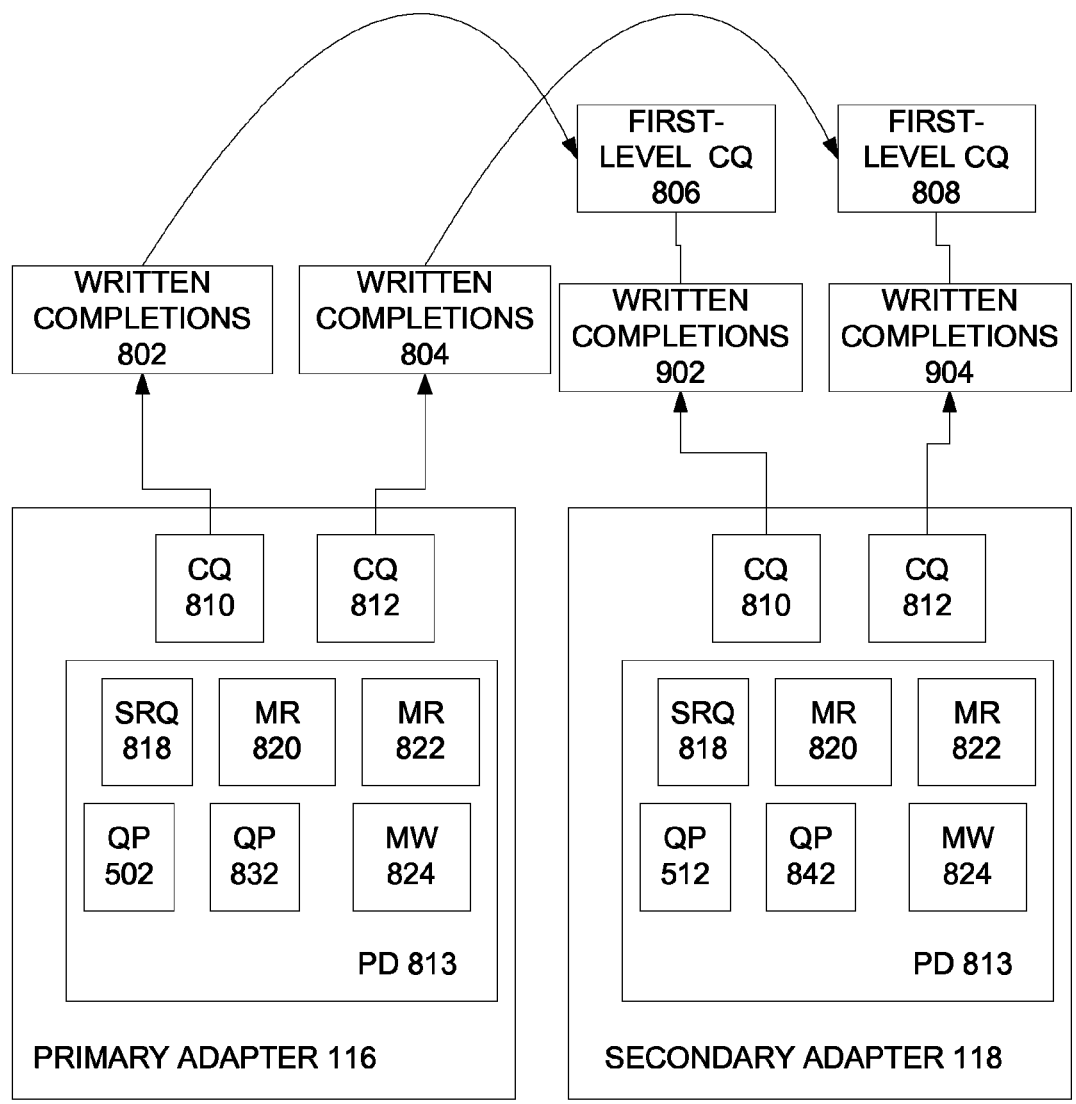
FIG. 9 represents an exemplary migration of a single RDMA session upon failure of an exemplary adapter of an exemplary node of the apparatus of FIG. 1.

FIG. 9 represents an exemplary migration of a single RDMA session upon failure of an exemplary RDMA adapter 116. Upon failure of the primary RDMA adapter 116, the session fail-over module 412 in an example retrieves all written completions 802, 804 of the primary RDMA adapter 116 prior to the failure. The session fail-over module 412 in an example moves the written completions 802, 804 to the first-level software completion queues (CQs) 806, 808. Once an exemplary RDMA application 402 on the node 102 dequeues all available completions 802, 804 from the first-level CQs 806, 808, subsequent dequeue attempts should directly retrieve the written completions 902, 904 from the underlying CQs 810, 812 on the secondary RDMA adapter 118. After the primary RDMA adapter 116 fails, any Send Queue or Receive Queue operations posted by the RDMA applications 402 on the node 102 in an example are posted on instances of backup queue pairs (QPs) 512, 842 created on the secondary RDMA adapter 118. An exemplary backup connection chosen from among a set of backup connections in an example may be predetermined for a given type of failure or negotiated by the session fail-over modules 412 on nodes 102, 104 at the time of failure of the primary RDMA adapter 116.

Figure 10:
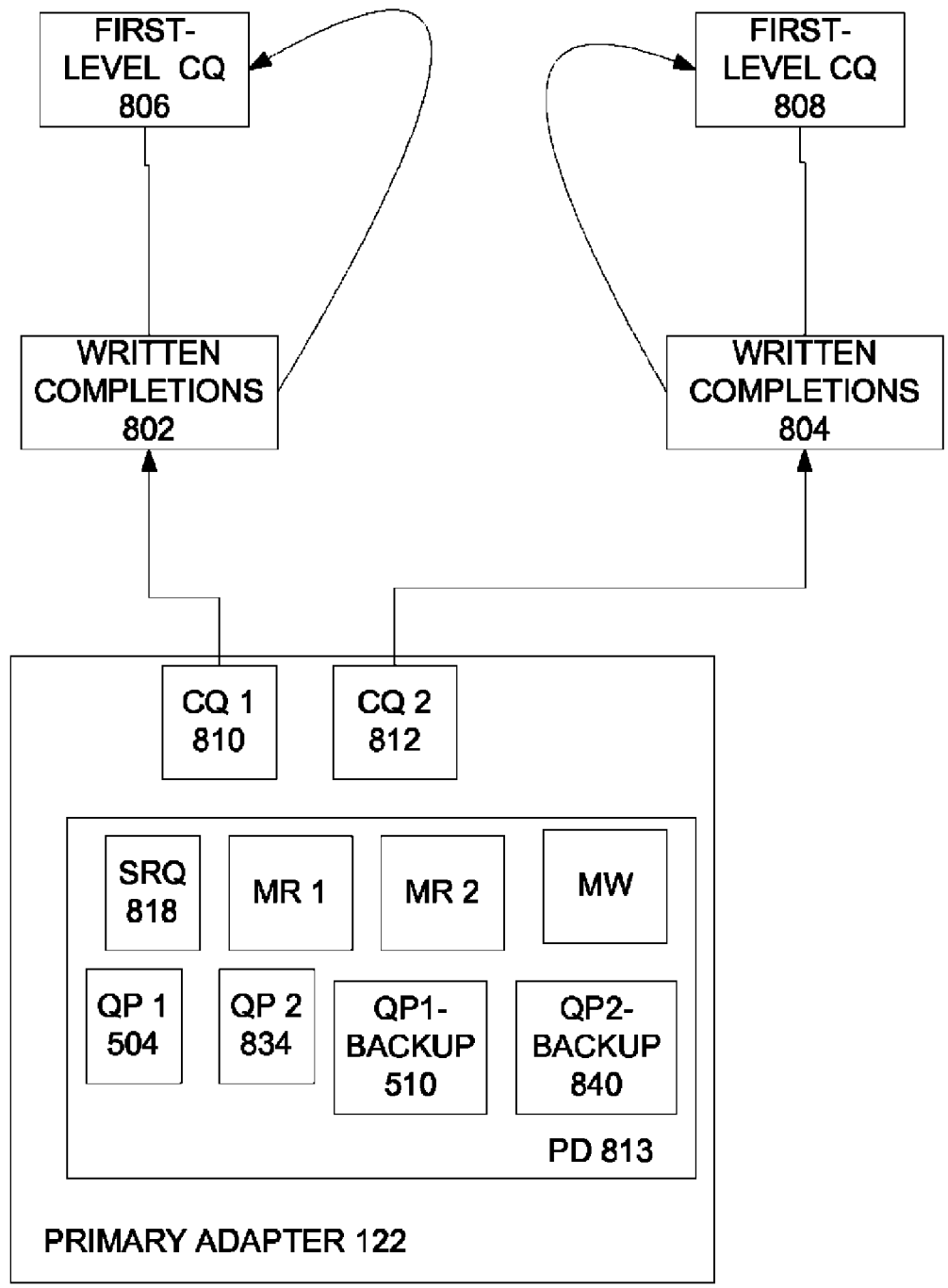
FIG. 10 represents an exemplary migration of a single RDMA session on an exemplary local node without failure of an exemplary RDMA adapter, upon failure of an exemplary RDMA adapter on an exemplary remote node.

FIG. 10 represents an exemplary migration of a single RDMA session on a local node 104 without failure of an exemplary primary RDMA adapter 122, upon failure of an exemplary primary RDMA adapter 116 on a remote node 102. The session fail-over module 412 in an example stops using the QPs, 504, 834 on the primary RDMA adapter 122 that are connected to the failed primary RDMA adapter 116. The session fail-over module 412 in an example starts using instances of the prepared backup QPs 510, 840 on the primary RDMA adapter 122 connected to a remote secondary adapter 118. Since the primary RDMA adapter 122 did not fail, the backup QPs 510, 840 are resident on the same adapter 122 thereby not requiring migrating the RDMA application 402 on the node 104 over to the secondary adapter 124. Prior to using the backup QPs 510, 840 on the primary RDMA adapter 122, the session fail-over module 412 in an example may need to handle the affected QPs 504, 834 such as through movement to an ERROR state, destruction, and/or marking as stale, for example, to stop accepting more completions from the affected QPs. The session fail-over module 412 in an example retrieves the completions 802, 804 written so far by the primary RDMA adapter 122, from all the CQs that are associated with the affected QPs 504, 834 and moves the retrieved completions 802, 804 to the respective first-level CQs 806, 808. Once the RDMA application 402 on the node 104 in an example dequeues all available completions 802, 804 from the first-level CQs 806, 808, subsequent dequeue attempts should directly retrieve the completions 806, 808 written by the same underlying CQs 810, 812 that were used before. These subsequent completions 806, 808 written by the same underlying CQs 810, 812 in an example result from subsequent Send Queue or Receive Queue operations posted on the backup QPs 510, 840. Any, all, and/or substantially all uncompleted received posted to the SRQs of the primary RDMA adapter 122 in an example may remain posted.

An illustrative description of an exemplary operation of an implementation of the apparatus 100 is presented, for explanatory purposes. FIG. 11 is a representation of an exemplary logic flow 1102 for exemplary session fail-over of an implementation of the apparatus 100. At STEP 1104 in an example the session fail-over module 412 makes a determination that a session is impacted by a failed RDMA adapter 116, 118, 122, 124, for example, local or remote. An exemplary approach may be undertaken and/or technique applied for each session in the event of a network failure. If a given session is not impacted, for example, because the session is without RDMA resources using the path of the network that failed, the session in an example does not need to undergo migration. At STEP 1106 in an example the session fail-over module 412 makes a determination whether the adapter failure is local. If yes, the session fail-over module 412 in an example waits for the RDMA application sessions to stop accessing the failed adapter and puts the RDMA applications 402 to sleep. When a session does need to undergo migration, exemplary care may be taken so that the session does not access the failed adapter in case of a local adapter failure. This may involve disabling inadvertent access to the adapter's registers, etc. and making the RDMA application 402 on the local node 102 wait until the migration is complete.

At STEP 1106 in an example the session fail-over module 412 drains each CQ 810, 812 on the failed RDMA adapter and moves the entries to first-level software CQs 806, 808. The pending completions 802, 804 in an example are retrieved and moved to the first level software CQs 806, 808. At STEP 1106 in an example if any memory window binds are complete, the session fail-over module 412 re-binds reliably on the backup QPs 814, 816. An exemplary Bind Memory Window operation is posted on the send queue of a QP which instructs the RDMA adapter to allow remote access to a subset of a Memory Region. At STEP 1106 in an example the session fail-over module 412 sets the two connection state parameter, LAST_RELIABLE_SENT_MSGID and LAST_RELIABLY_RECEIVED_MSGID for each connection in the session and reports them to the remote node in an exemplary REPORT1. If the adapter failure is remote, or upon completion of STEP 1106 in a case of local adapter failure, STEP 1106 in an example proceeds to STEP 1114.

STEP 1114 in an example is reached when a REPORT1 is received by the session fail-over module 412 on the local node from the remote node. In an exemplary approach, a REPORT1 may be send from the node 102 to the node 104 at STEP 1106 and another REPORT1 may be sent from the node 104 to the node 102 at the end of STEP 1114. An exemplary implementation performs similar and/or analogous processing of the REPORT1, for example, regardless whether a REPORT1 is received by the node 102 or the node 104. A few exemplary differences in processing of REPORT1 may exist, for example, based on whether the node 104 received REPORT1 or the node 102 received REPORT1 in response to the REPORT1 that the node 102 sent to the node 104. At STEP 1114 in an example the session fail-over module 412 determines if a REPORT1 has already been sent for the connection from the local node to the remote node when a REPORT1 is received. This can happen in an example when there is a local adapter failure on node 102 and the session fail-over module 412 on node 102 proceeded from STEP 1106 to STEP 1114 for a connection after sending a REPORT1 for the connection from the local node 102 to the remote node 104. If a REPORT1 has not been sent for the connection yet but only received at STEP 1114, the session fail-over module 412 in an example drains the CQ associated with the connection and moves the entries to first-level software CQs. The session fail-over module 412 on node 104 in an example may have landed at STEP 1114 when there is a remote adapter failure on node 102 and the session fail-over module 412 on node 102 sent a REPORT1 for a connection while the session fail-over module 412 on node 104 effectively skipped 1106 and proceeded to STEP 1114 for the connection.

Further at STEP 1114 in an example if nay memory window binds are complete, the session fail-over module 412 re-binds reliably on the backup QPs 814, 816. The session fail-over module 412 in an example updates LAST_RELIABLE_SENT_MSGID and LAST_RELIABLY_RECEIVED_MSGID on the connection. The session fail-over module 412 in an example executes the remainder of STEP 1114 regardless whether a REPORT1 has been sent for this connection. AT STEP 1114 in an example, the session fail-over module 412 determines if LAST_RELIABLY_SENT_MSGID in the REPORT1 received exceeds the LAST_RELIABLY_RECEIVED_MSGID setting on the connection. If yes, the session fail-over module 412 takes care of lost receive completions for the data successfully received by looking into the buffers posted on the QPs and SRQs. The session fail-over module 412 in an example scans the receive buffer header area posted to QPs, 504, 834 and SRQs 818 (FIG. 8) for completions not reported in the CQ 810, 812. This is the are in an example that receives the session fail-over header 606 sent across by the session fail-over module 412 on the remote node. Successful receive operations in an example are indicated by an appropriate bit in the MESSAGE_FLAGS of the session fail-over header 606.

The session fail-over module 412 on the local node in an example creates software completions in the corresponding first-level CQ 806, 808 after looking into the receive buffer header area for the messages considered to be reliably sent as reported by the remote node in REPORT1. The session fail-over module 412 in an example updates LAST_RELIABLY_RECEIVED_MSGID on the connection. The session fail-over module 412 in an example re-posts on the corresponding backup QP 510, 840 the receives seen as uncompleted after reconstructing the receive completions for the messages considered to be reliably sent, for example, as reported by the remote node in REPORT1. If local adapter failure, the session fail-over module 412 in an example reposts on SRQs 818 on the corresponding backup RDMA adapter 118 the receives seen as uncompleted after reconstructing the receive completions for the messages considered to be reliably sent, for example, as reported by the remote node in REPORT1, for example, if the QP or connection is the last to be migrated among the QPs associated with the SRQ. If remote failure only, the session fail-over module 412 in an example marks old primary receive queues of QPs, 504, 834 as stale. This in an example causes any future receive completions from the old primary QPs 504, 834 to be dropped after switching to the backup QPs 510, 840.

At STEP 1114 in an example the session fail-over module 412 makes a determination whether any pending sends exist without local send completions on the CQ 810, 812. At STEP 1114 in an example, the session fail-over module 412 looks into LAST_RELIABLY_RECEIVED_MSGID, for example, in the REPORT1 reported by the remote node 104 for this connection. If any of the responses to the follow-on RDMA-reads injected by the session fail-over module 412 have been lost in the fabric, LAST_RELIABLY_RE-CEIVED_MSGID from the remote node reliably indicates whether the RDMA sends from the RDMA application that are preceding the follow-on RDMA-read from the session fail-over module 412 actually were successfully received by the remote coherency domain. On the other hand, if in an example the RDMA application 402 initiates and RDMA write followed by an RDMA send and the session fail-over module 412 injected the follow-on RDMA-read after either operation, it is possible for the remote RDMA adapter to die and/or fail right before the RDMA Send can be processed successfully. This in an example causes the requesting session fail-over module 412 to record the RDMA write as completed whereas the responding session fail-over module 412 would not have seen the RDMA write, for example, because an RDMA write message does not comprise the session fail-over header. So, the LAST_RELIABLY_RE-CEIVED_MSGID reported by the responding session fail-over module 412 in an example will be one lower than the LAST_RELIABLY_SENT_MSGID recorded by the requesting session fail-over module 412. The maximum of the LAST_RELIABLE_SENT_MSGID recorded by the requesting session fail-over module 412 and the LAST_RE-LIABLY_RECEIVED_MSGID reported by the responding session fail-over module 412 in an example indicates the last message seen as completed by either session fail-over module.

Based on this information, the session fail-over module 412 in an example makes a determination whether more RDMA sends or more RDMA writes have completed. If yes, the session fail-over module 412 in an example creates software completions for the completed operations on the appropriate first-level software CQ. The session fail-over module 412 in an example updates LAST_RELIABLY_SENT_MS-GID on the connection. The session fail-over module 412 in an example makes a determination whether any binds were done prior to the completed sends. If yes, the session fail-over module 412 in an example creates software completions for the completed binds and re-binds the memory windows reliably on the backup QPs. A Bind Memory Window operation is posted on the send queue of a QP which instructs the RDMA adapter to allow remote access to a subset of a Memory The session fail-over module in an example makes a determination whether only a remote RDMA adapter 116 failed. If yes, the session fail-over module in an example marks send queues of old primary QPs 504, 834 stale. This in an example causes any future send completions from the old primary QPs 504, 834 to be dropped after switching to the backup QPs 510, 840. If a REPORT1 has not been sent already for the connection but only received at STEP 1114 in an example the session fail-over module 412 communicates LAST_RELIABLY_SENT_MSGID and LAST_RELI-ABLY_RECEIVED_MSGID of the connection to the appropriate remote node 102 in REPORT1.

The session fail-over module 412 on node 102 in an example can enter STEP 1114 upon receipt of REPORT1 from the session fail-over module 412 on node 104 that send REPORT1 upon completion of STEP 1114. At STEP 1114 in an example, if a REPORT1 has already been sent by the session fail-over module 412 at STEP 1106, the session fail-over module 412 reposts on the backup QP the messages with MESSAGE_ID less then LAST_RELIABLY_SENT_MS-GID setting on the connection and sends a MIGRATED message to the remote node 104. Upon receiving MIGRATED message from the session fail-over module 412 on node 102, or upon completion of STEP 1114 by sending the MIGRATED message to the remote node 104, STEP 1114 in an example proceeds to STEP 1116.

At STEP 1116 in an example, the session fail-over module 412 determines if there are some outstanding RDMA sends or RDMA writes posted by the RDMA application 402 that never made it to the remote node. It is possible for the session fail-over module 412 in an example to deem an RDMA write posted by the RDMA application 402 never made it to the remote node because of the failure to receive the completion of a follow-on RDMA-read injected by the session fail-over module 412 when the data payload of the RDMA-write operation was actually successfully written to the responding node coherency domain. This situation in an example could happen when the responder RDMA adapter failed just after completing the processing of the RDMA-write operation but before processing the follow-on RDMA-read operation. An exemplary approach may suggest and/or specify that an RDMA application 402 on the responding node rely on the receive completion of only a subsequent RDMA Send operation to indicate prior RDMA write operations have successfully completed on the responding node. So, an exemplary session fail-over module 402 on the requesting node may consider that the RDMA-write operation never made it to the remote node. The session fail-over module 412 in an example subsequently reposts on the backup QP the outstanding RDMA sends and RDMA writes posted by the RDMA application 402 that never made it to the remote node. This serves to place the QP or connection in MIGRATED state. Once all the connections in a Session are in MIGRATED state, the Session in an example is considered to be in MIGRATED state. The session fail-over module 412 put the session application back in operation.

FIG. 12 is a representation of an exemplary logic flow 1202 for exemplary preparation of session for a subsequent failure in the apparatus 100. After a session is fully migrated to the secondary, exemplary care may be taken to prepare the restored adapter or path for a subsequent failure. At STEP 1204, the session fail-over module 412 in an example keeps the sessions in migrated state until the failed link or RDMA adapter is restored. Assuming another failure of a link or RDMA adapter does not happen too soon in an example there are not critical time limits for re-arming the sessions with backup resources. The session fail-over module 412 in an example reclaims the old primary resources as the new backup resources. An exemplary approach postpones and/or avoids performance of time-consuming tasks, for example, until a restoration time. For example, performance of the fail-over in the exemplary logic flow 1102, waiting for the failed primary QPs to flush all of their pending operations, and cleaning up the associated completions may be time consuming. One or more of such tasks may be avoided by the session fail-over module 412 and postponed to the time of restoring the failed link or RDMA adapter. At STEP 1206, if local RDMA adapter had failed, the session fail-over module 412 in an example cleans up the data structures associated with the QPs, CQs, SRQs, PD, MRs, MWs, etc. that were created in the middleware 410 or in the RDMA device driver. At STEP 1208, the session fail-over module 412 in an example drains each CQ 810, 812, for example, to discard any, all, and/or substantially all stale completions. The stale completions in an example may be present as a result of the session fail-over module 412 performing the STEP 1114 in which primary QPs may be market stale. The draining of each CQ 810, 812 at STEP 1208 in an example may also result in successful completions from the active QPs that are not impacted by the failure and that are associated with the CQs 810, 812. The session fail-over module 412 in an example moves the successful completions to the first-level CQs 806, 808. At STEP 1210, the session fail-over module 412 in an example recreates the new backup resources similarly and/or analogously to how the session fail-over module 412 created the backup resources, as described herein. After the session fail-over module 412 in an example completes creation of backup resources, the session is back in a highly available state and is fully prepared for another instance of failure.

An exemplary implementation comprises an RDMA (Remote Direct Memory Access) network adapter located at an interface of a requester node coherency domain that sends an RDMA read request to a responder node coherency domain to flush into the responder node coherency domain data previously sent by the RDMA network adapter.

The RDMA network adapter is not coherent with the requester node coherency domain. The RDMA network adapter comprises a requester RDMA network adapter. The requester RDMA network adapter is not coherent with the requester node coherency domain. A responder RDMA network adapter is located at an interface of the responder node coherency domain. The responder RDMA network adapter is not coherent with the responder node coherency domain. The requester RDMA network adapter sends the data to the responder RDMA network adapter. The requester RDMA network adapter sends the RDMA read request to the responder RDMA network adapter to flush the data into the responder node coherency domain.

The RDMA network adapter comprises a requester RDMA adapter located at the interface of the requester node coherency domain. A responder RDMA network adapter is located at an interface of the responder node coherency domain. An RDMA computer program is located in the requester node coherency domain that sends the data to the requester RDMA network adapter that in turn sends the data to the responder RDMA adapter that in turn sends the data to the responder node coherency domain. The RDMA computer program comprises an RDMA user-level computer application that sends the data to the requester RDMA network adapter that in turn sends the data to the responder RDMA adapter that in turn sends the data to the responder node coherency domain.

The RDMA computer program sends the data as an RDMA Send Queue operation to the requester RDMA network adapter that in turn sends the data as the RDMA Send Queue operation to the responder RDMA adapter that in turn sends the data as DMA (Direct Memory Access) write to the responder node coherency domain. The data comprises selected data. The RDMA computer program sends the selected data as an RDMA Send Queue operation to the requester RDMA network adapter that in turn sends the selected data as the RDMA Send Queue operation in a same RDMA connection to the responder node coherency domain. A session fail-over computer program, after the RDMA computer program sends the selected data to the requester RDMA network adapter, sends the RDMA read request to the RDMA network adapter that in turn sends the RDMA read request in the same RDMA connection to the responder RDMA adapter that in turn reads random and/or inconsequential data as DMA read from the responder node coherency domain to flush the selected data into the responder node coherency domain.

The session fail-over computer program comprises a requester session fail-over computer program that is located in server middleware of the requester node coherency domain. A responder session fail-over computer program is located in server middleware of the responder node coherency domain. The responder RDMA adapter reads the random and/or inconsequential data as the DMA read from memory exposed by the responder session fail-over computer program.

The session fail-over computer program comprises a session fail-over user-level computer application that sends the RDMA read request to the requester RDMA network adapter that in turn sends the RDMA read request in the same RDMA connection to the responder RDMA adapter that in turn reads the random and/or inconsequential data as the DMA read from the responder node coherency domain to flush the selected data into the responder node coherency domain.

The RDMA network adapter sends the data in a same RDMA connection to the responder node coherency domain. The RDMA network adapter sends the RDMA read request in the same RDMA connection to the responder node coherency domain to flush the data into the responder node coherency domain.

A session fail-over computer program sends the RDMA read request, independently of any and/or substantially all device-specific RDMA adapter information, to the RDMA network adapter that in turn sends the RDMA read request to the responder node coherency domain to flush the data into the responder node coherency domain.

A session fail-over computer program performs an RDMA read operation after every Send Queue operation of RDMA write operation from an RDMA computer program to send a corresponding RDMA read request to the RDMA network adapter that in turn sends the RDMA read request to the responder node coherency domain to flush into the responder node coherency domain data from a corresponding Send Queue operation or RDMA write operation.

The RDMA network adapter comprises a primary requester-node RDMA network adapter located at the interface of the requester node coherency domain, wherein a secondary requester-node RDMA network adapter is located at the interface of the requester node coherency domain. A primary responder-node RDMA network adapter is located at an interface of the responder node coherency domain, wherein a secondary responder-node RDMA network adapter is located at the interface of the responder node coherency domain. A responder-node session fail-over computer program associates an identical value of a target memory buffer handle with the primary responder-node RDMA network adapter and the secondary responder-node RDMA network adapter. The requester-node session fail-over computer program sends an RDMA write request or RDMA read request originating in an RDMA computer program and tagged with the identical value of the target memory buffer handle, to the primary or secondary requester-node RDMA network adapter that in turn sends the RDMA write request or RDMA read request tagged with the identical value of the target memory buffer handle, to the primary or secondary responder-node RDMA network adapter that in turn performs a corresponding DMA write operation to or DMA read operation from the responder node coherency domain.

The RDMA network adapter comprises a primary requester-node RDMA network adapter located at the interface of the requester node coherency domain. A secondary requester-node RDMA network adapter is located at the interface of the requester node coherency domain. A primary responder-node RDMA network adapter is located at an interface of the responder node coherency domain. A secondary responder-node RDMA network adapter is located at the interface of the responder node coherency domain. A responder-node session fail-over computer program associates a first value of a target memory buffer handle with the primary responder-node RDMA network adapter and a second value of the target memory buffer handle with the secondary responder-node RDMA network adapter. The responder-node session fail-over computer program selects a single value, from the first and second values, of the target memory buffer handle coordinated with a corresponding one active adapter of the primary and secondary responder-node RDMA network adapters. The responder-node session fail-over computer program returns the single value of the target memory buffer handle to a responder-node RDMA computer program. The requester-node session fail-over computer program sends an RDMA write request or RDMA read request originating in a requester-node RDMA computer program and tagged with the single value of the target memory buffer handle, to the primary or secondary requester-node RDMA network adapter that in turn sends the RDMA write request or RDMA read request tagged with the single value of the target memory buffer handle to the one active adapter of the primary and secondary responder-node RDMA network adapters that in turn performs a corresponding DMA write operation to or DMA read operation from the responder node coherency domain.

Upon a single failure of the RDMA network adapter, one or more sessions on only the RDMA network adapter undergo a total migration to a secondary RDMA network adapter to effect a fail-over. One or more sessions on corresponding additional non-failed RDMA network adapters continue to employ the corresponding additional non-failed RDMA network adapters. Upon a failure of a network switch in a communication path with the RDMA network adapter, automatic port migration is employable to effect a fail-over and alleviate from a session fail-over computer program a responsibility to handle the failure of the network switch.

An exemplary implementation comprises an RDMA (Remote Direct Memory Access) computer program located in a requester node coherency domain that interprets an indication of acknowledgement of an RDMA read request from an RDMA network adapter on a responder node coherency domain as a guarantee of delivery of data previously sent from the requester node coherency domain to the responder node coherency domain.

The indication of acknowledgement of the RDMA read request from the RDMA network adapter on the responder node coherency domain comprises a transport-level acknowledgement of completion of the RDMA read request from the RDMA network adapter on the responder node coherency domain. The RDMA computer program interprets the transport-level acknowledgement of completion of the RDMA read request from the RDMA network adapter on the responder node coherency domain as the guarantee of delivery of the data previously sent from the requester node coherency domain to the responder node coherency domain. The RDMA computer program comprises an RDMA user-level computer application that interprets the indication of acknowledgement of the RDMA read request from the RDMA network adapter on the responder node coherency domain as the guarantee of delivery of the data previously sent from the requester node coherency domain to the responder node coherency domain.

An exemplary implementation comprises a session fail-over coordinator that associates an identical value of a target memory buffer handle with a primary RDMA (Remote Direct Memory Access) network adapter and a secondary RDMA network adapter located at an interface of a requester node coherency domain. The session fail-over coordinator sends one or more RDMA requests, tagged with the identical value of the target memory buffer handle, to the responder node coherency domain to ensure an RDMA computer program and/or user-level computer application located in the responder node coherency domain or in the requester node coherency domain is unaware of a fail-over to the secondary RDMA network adapter that the session fail-over coordinator performs upon a failure of the primary RDMA network adapter.

An exemplary approach selects or a Queue Pair (QP) a local RDMA (Remote Direct Memory Access) network adapter that comprises a simplex switchless connection with a counterpart QP on a remote RDMA network adapter.

A choice of the local RDMA network adapter for the QP is deferred until an establishment of a switchless connection that selects the remote RDMA network adapter for the counterpart QP. The QP is employable as a send queue for a local RDMA computer program. A choice of the local RDMA network adapter for the QP as the send queue for the local RDMA computer program is deferred until an establishment of a switchless connection with the counterpart QP on the remote RDMA network adapter that is employable as a receive queue for a remote RDMA computer program. At a local session fail-over computer program the establishment of the simplex switchless connection with the counterpart QP on the remote RDMA network adapter is employed to select the local RDMA network adapter for the QP as the send queue for the local RDMA computer program.

A choice of a local RDMA network adapter for a QP as a receive queue for the local RDMA computer program is communicated to allow section and/or identification of a remote RDMA network adapter for a counterpart QP as a send queue for the remote RDMA computer program. A at a remote session fail-over computer program the choice of the local RDMA network adapter for the QP as the receive queue is employed to select the remote RDMA network adapter for the counterpart QP as the send queue for the remote RDMA computer program.

At a remote session fail-over computer program the choice of the local RDMA network adapter for the QP as the receive queue is employed to select the remote RDMA network adapter for the counterpart QP as the send queue for the remote RDMA computer program. At a remote session fail-over computer program the choice of the local RDMA network adapter for the QP as the receive queue is employed to establish a simplex switchless connection between the local RDMA network adapter for the QP as the receive queue and the remote RDMA network adapter for the counterpart QP as the send queue for the remote RDMA computer program. The local RDMA computer program comprises a local RDMA user-level computer application. The remote RDMA computer program comprises a remote RDMA user-level computer application. A choice of the local RDMA network adapter for the QP as the send queue for the local RDMA user-level computer application is deferred until the establishment of the switchless connection with the counterpart QP on the remote RDMA network adapter that is employable as the receive queue for the remote RDMA user-level computer application. The QP is employable as a send queue for a local RDMA computer program. At a local session fail-over computer program an identification of the counterpart QP as a receive queue for a remote RDMA computer program is employed to establish a simplex switchless connection between the local RDMA network adapter for the QP as the send queue for the local RDMA computer program and the remote RDMA network adapter for the counterpart QP as the receive queue for the remote RDMA computer program.

An exemplary implementation comprises a requester RDMA (Remote Direct memory Access) session fail-over coordinator on a coherency domain that adds a session fail-over header to a front of a data payload sent by an RDMA computer program from the coherency domain. Upon termination, of an RDMA adapter not coherent with the coherency domain and in a communication path of the data payload, before delivery to the RDMA computer program of a receive completion notification for the data payload, the session fail-over header is employable by a responder RDMA session fail-over coordinator to reconstruct the receive completion notification.

The requester RDMA session fail-over coordinator makes a determination the data payload comprises a data payload of an RDMA Send operation. The requester RDMA session fail-over coordinator adds the session fail-over header to the front of the data payload of the RDMA Send operation based on the determination the data payload comprises a data payload of an RDMA Send operation. The requester RDMA session fail-over coordinator makes a determination a particular data payload send by the RDMA computer program comprises a data payload of an RDMA-write operation. The requester RDMA session fail-over coordinator omits the session fail-over header from the particular data payload of the RDMA-write operation based on the determination the particular data payload comprises a data payload of an RDMA-write operation.

The requester RDMA session fail-over coordinator avoids compromise of transparency of the request RDMA session fail-over header from a perspective of a responder RDMA computer program through omission of the session fail-over header from the font of the data payload of the RDMA-write operation to avoid writing data into an RDMA-write target buffer associated with the responder RDMA computer program. The coherency domain comprises a requester coherency domain. Upon a determination by the requester RDMA session fail-over coordinator of termination of an RDMA adapter, not coherent with the coherency domain and in a communication path of the data payload of the RDMA-write operation, before completion of a follow-on RDMA-read operation, injected by the requester RDMA session fail-over coordinator and wherein the completion serves to signify to the requester RDMA session fail-over coordinator a delivery completion of the data payload of the RDMA-write operation, the requester RDMA session fail-over coordinator causes a repeat RDMA-write operation from the requester coherency domain. The RDMA computer program comprises an RDMA user-level computer application, wherein the requester RDMA session fail-over coordinator adds the session fail-over header to the front of the data payload sent by the RDMA user-level computer application from the coherency domain.

An exemplary implementation comprises a requester RDMA (Remote Direct Memory Access) session fail-over coordinator on a coherency domain that effects transparency from a perspective of an RDMA computer program from the coherency domain through: addition of a session fail-over header to a front of a data payload of an RDMA Send operation sent by the RDMA computer program and addition of a corresponding scatter-gather element and/or extra receive buffer area in a matching RDMA Receive operation on a responding node to correctly receive the session fail-over header on the responding node; and omission of the session fail-over header from a front of a data payload of an RDMA-write operation sent by the RDMA computer program. Upon termination, of an RDMA adapter not coherent with the coherency domain and in a communication path of the data payload of the RDMA Send operation, before delivery to the RDMA computer program of a receive completion notification for the data payload RDMA Send operation, the session fail-over header is employable by a responder RDMA session fail-over coordinator to reconstruct the receive completion notification.

A completion queue holds completions drained by the session fail-over coordinator while the RDMA application is unready to consume the completions. The completion queue comprises a first-level completion queue (CQ). The requester RDMA session fail-over coordinator automatically forwards a dequeue attempt by the RDMA computer program to an underlying completion queue (CQ) when no more completions remain on the first-level completion queue (CQ). The completion queue comprises a first-level completion queue CQ). The requester RDMA session fail-over coordinator makes the first-level completion queue (CQ) transparent to the RDMA computer program through creation of a perception the first-level completion queue (CQ) as an underlying completion queue (CQ). The RDMA computer program comprises an RDMA user-level computer application. The requester RDMA session fail-over coordinator effects transparency from the perspective of the RDMA user-level computer application from the coherency domain.

An implementation of the apparatus 100 in an example comprises a plurality of component such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises the recordable data storage medium of the memories 128, 130 of the servers 114, 120. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A process comprising:
   in response to receiving from a consumer running on a hardware requester node a first request for a Remote Data Memory Access (RDMA) write or send directed to a responder node, transmitting the first request via a hardware primary requester RDMA network interface of the requester node to a primary responder RDMA network interface of said responder node;
   after transmitting the first request, transmitting a second request for a read via the requester RDMA network interface to the responder RDMA network interface; and
   in response to a notification that the read has been completed, informing the consumer that the RDMA write or send has been completed.

2. A process as recited in claim 1 further comprising:
   pre-pending a header specifying a message identifier and a connection identifier to a send request and transmitting the send request with the pre-pended header; and
   transmitting an RDMA write request without pre-pending a header to the write request.

3. A process as recited in claim 1 further comprising, before transmitting the first request, turning off completion notifications for RDMA writes and sends for the requester RDMA network interface.

4. A process as recited in claim 1 further comprising creating connections:
   between the primary requester RDMA network interface and the primary responder RDMA network interface;
   between the primary requester RDMA network interface and a standby responder RDMA network interface of the responder node; and
   between a standby requester RDMA network interface of the requester node and the primary responder RDMA network interface.

5. A process as recited in claim 4 further comprising, after the creating and in response to a failure associated with one of the primary RDMA network interfaces, switching from one of the connections to another of the connections.

6. A manufacture comprising non-transitory computer-readable storage media encoded with code configured to, when executed by a hardware requester node,
   in response to receiving from a consumer running on the requester node a first request for a Remote Data Memory Access (RDMA) write or send directed to a responder node, transmitting the first request via a hardware primary requester RDMA network interface of the requester node to a primary responder RDMA network interface of said responder node;
   after transmitting the first request, transmitting a second request for a read via the requester RDMA network interface to the responder RDMA network interface; and
   in response to a notification that the read has been completed, informing the consumer that the RDMA write or send has been completed.

7. A manufacture as recited in claim 6 wherein said code is further configured to:
   pre-pend a header specifying a message identifier and a connection identifier to a send request and transmitting to the responder node the send request with the pre-pended header; and
   transmit to the responder node an RDMA write request without a pre-pending a header to the write request.

8. A manufacture as recited in claim 6 further comprising, before transmitting the first request, turning off completion notifications for sends and RDMA writes for the requester RDMA network interface.

9. A manufacture as recited in claim 6 further comprising creating connections:
   between the primary requester RDMA network interface and the primary responder RDMA network interface;
   between the primary requester RDMA network interface and a standby responder RDMA network interface of the responder node; and
   between a standby requester RDMA network interface of the requester node and the primary responder RDMA network interface.

10. A manufacture as recited in claim 9 further comprising, after the forming and in response to a failure associated with one of the primary RDMA network interfaces, switching from one of the connections to another of the connections.

11. A switchless fabric comprising:
    first and second hardware nodes;
    first and second hardware remote data memory access (RDMA) connections between the first and second nodes; and
    first and second RDMA drivers configured to run respectively on the first and the second hardware nodes, the first and the second RDMA drivers being configured to operate the first and second connections in respective opposing-direction half-duplex modes, the first RDMA driver being configured to indicate to a consumer running on the first node that an RDMA write or send has been completed only after the first RDMA driver has received a notice that an RDMA read requested after said RDMA write or send has been completed.

12. A fabric as recited in claim 11 wherein the first RDMA driver advertises an address associated with the second connection and transmits send requests via the first connection.

13. A fabric as recited in claim 11 wherein the first RDMA driver is configured to prepend send requests but not RDMA write requests with headers containing a message identifier and a connection identifier.

14. A fabric as recited in claim 13 wherein the first RDMA driver is configured to prepend a header on received sends but not on received RDMA writes.

* * * * *